(12) United States Patent
Mamiya et al.

(10) Patent No.: US 7,456,836 B2
(45) Date of Patent: Nov. 25, 2008

(54) IMAGE DISPLAY SYSTEM

(75) Inventors: Johji Mamiya, Kanagawa-ken (JP); Kazushi Yamauchi, Kanagawa-ken (JP); Takatoshi Tomooka, Kanagawa-ken (JP)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 11/687,157

(22) Filed: Mar. 16, 2007

(65) Prior Publication Data

US 2007/0171229 A1 Jul. 26, 2007

Related U.S. Application Data

(63) Continuation of application No. 09/725,979, filed on Nov. 29, 2000, now abandoned.

(30) Foreign Application Priority Data

Nov. 30, 1999 (JP) ................... 11-341461

(51) Int. Cl.
*G06F 15/80* (2006.01)
*G06F 15/16* (2006.01)
*G09G 5/00* (2006.01)

(52) U.S. Cl. ................ 345/505; 345/502; 345/504; 345/1.1; 345/1.2; 345/1.3; 345/4

(58) Field of Classification Search ......... 345/502–505, 345/1.1, 1.3, 1.2, 2.1, 4
See application file for complete search history.

(56) References Cited

U.S. PATENT DOCUMENTS

| | | |
|---|---|---|
| 5,247,363 A | 9/1993 | Sun |
| 5,606,343 A | 2/1997 | Tsuboyama et al. |
| 5,636,631 A | 6/1997 | Waitz et al. |
| 5,828,383 A | 10/1998 | May et al. |
| 6,008,794 A | 12/1999 | Ishii |
| 6,150,996 A | 11/2000 | Nicholson et al. |

(Continued)

FOREIGN PATENT DOCUMENTS

JP 05/344317 12/1993

(Continued)

OTHER PUBLICATIONS

English language translation of abstract of WO 9711447.

(Continued)

*Primary Examiner*—Kee M. Tung
*Assistant Examiner*—Hau H Nguyen
(74) *Attorney, Agent, or Firm*—Thomas, Kayden, Horstemeyer & Risley

(57) ABSTRACT

Disclosed is a processing on a host side and a panel side, thus optimizing a work load of the whole of a system including a graphics chip. Provided is an image display system which comprises a host side for executing an application and a panel side connected to the host side, and displaying an image on the panel side, the host side transferring undeveloped image data to the panel side when an image display is requested of the panel side having a panel memory for developing the image, the panel side developing the image in the panel memory based on the image data transferred from the host side and displaying the image developed in the panel memory on the panel.

13 Claims, 18 Drawing Sheets

U.S. PATENT DOCUMENTS

| | | | |
|---|---|---|---|
| 6,323,854 B1 | 11/2001 | Knox et al. | |
| 6,380,942 B1 | 4/2002 | Hussain et al. | |
| 6,501,441 B1 | 12/2002 | Ludtke et al. | |
| 6,611,241 B1 * | 8/2003 | Firester et al. | 345/1.3 |
| 7,148,909 B2 * | 12/2006 | Yui et al. | 345/660 |

FOREIGN PATENT DOCUMENTS

| | | |
|---|---|---|
| JP | 07-146671 | 6/1995 |
| JP | 7175445 | 7/1995 |
| JP | 07-261721 | 10/1995 |
| JP | 08/055223 | 2/1996 |
| JP | 8076721 | 3/1996 |
| JP | 9006306 | 1/1997 |
| JP | 09-204164 | 8/1997 |
| JP | 9281933 | 10/1997 |
| JP | 10-260665 | 9/1998 |
| JP | 11-149283 | 6/1999 |
| JP | 11242469 | 9/1999 |
| JP | 2000-305553 | 11/2000 |
| JP | 2000-330536 | 11/2000 |
| JP | 2001154653 | 6/2001 |
| JP | 2001222249 | 8/2001 |
| WO | WO 9711447 | 3/1997 |

OTHER PUBLICATIONS

English language translation of abstract of JP 9281933.
English language translation of abstract of JP 7175445.
English language translation of abstract of JP 2001222249.
English language translation of abstract of JP 2001154653.
English language translation of abstract of JP 9006306.
English language translation of abstract of JP 8076721.
English language translation of abstract of JP 11242469.

* cited by examiner

FIG. 7
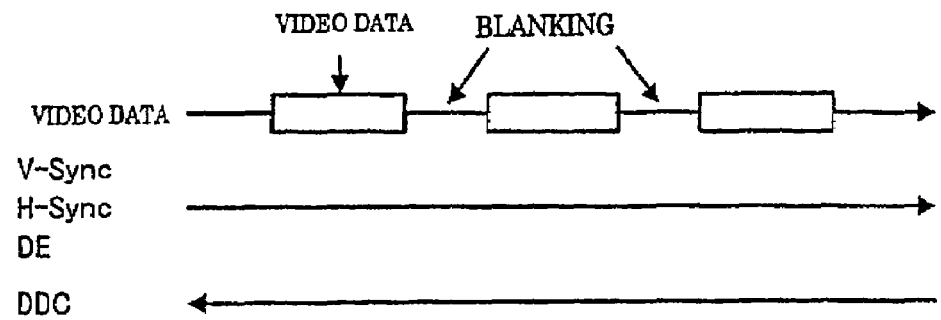
(a) CONVENTIONAL TRANSFER OF VIDEO DATA
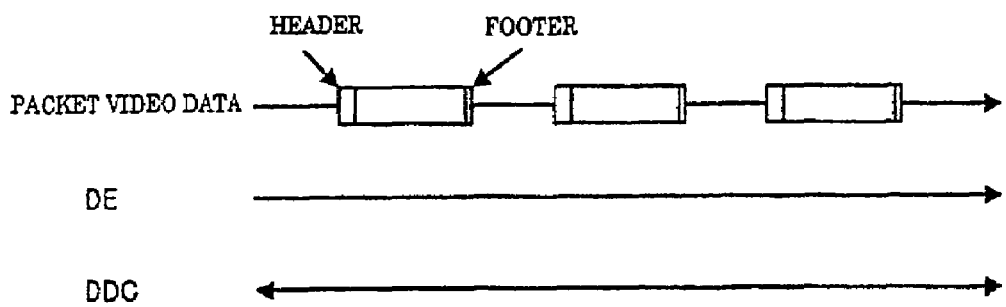
(b) TRANSFER OF VIDEO DATA IN THIS EMBODIMENT
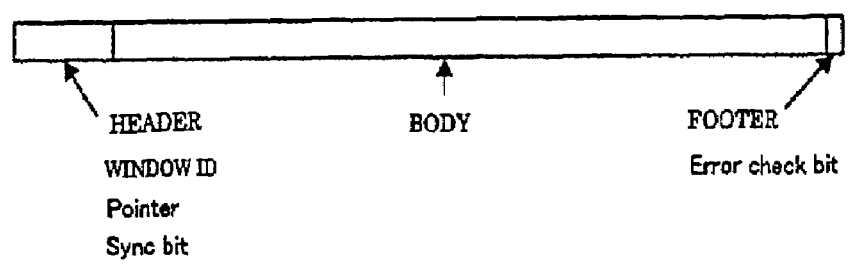
(c) FORMAT OF PACKET VIDEO DATA FIG. 9
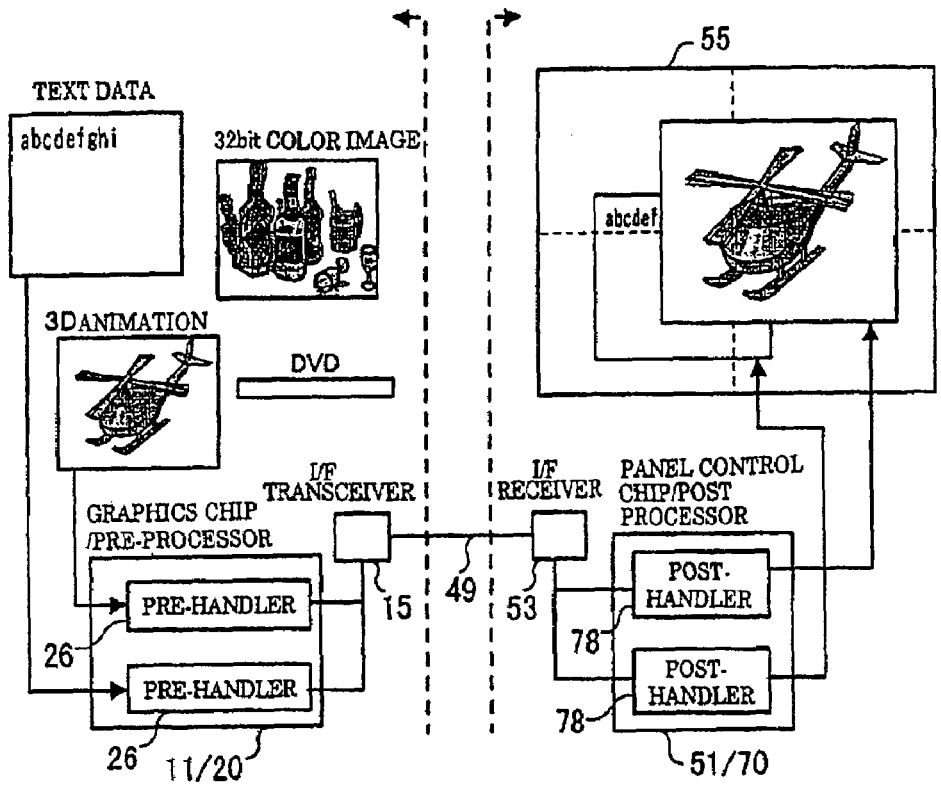
(a) DATA SOURCE AND PROCESSING SYSTEM
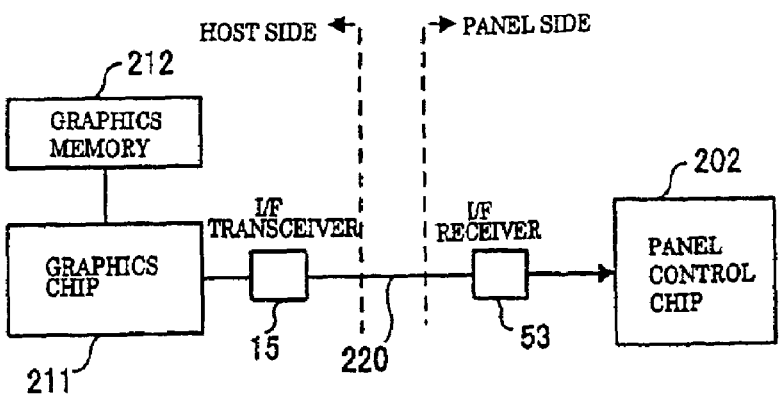
(b) LIMITATION OF DATA BAND WIDTH FIG. 17
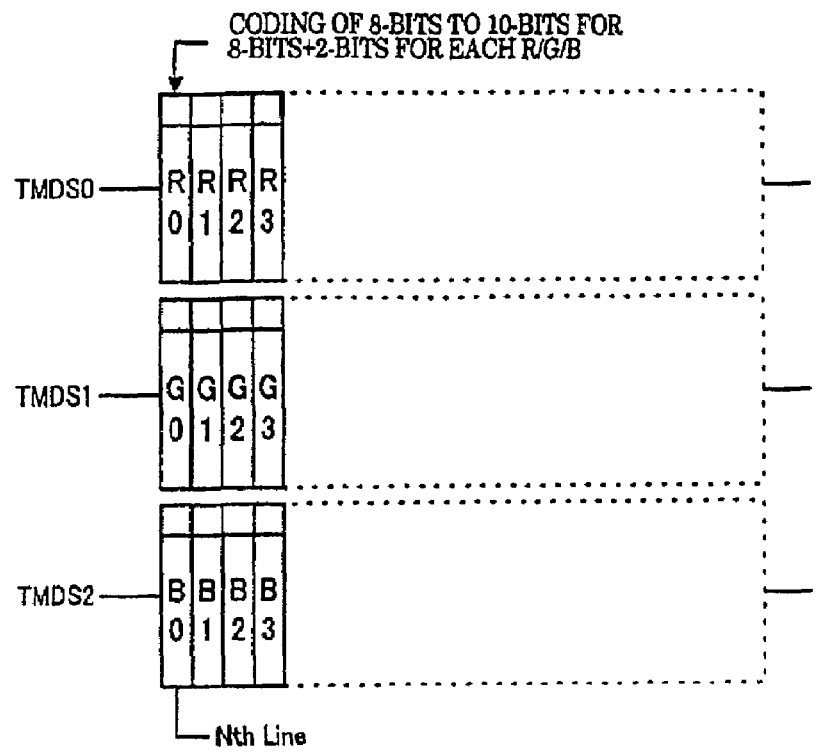
(a) TMDS DATA TRANSFER
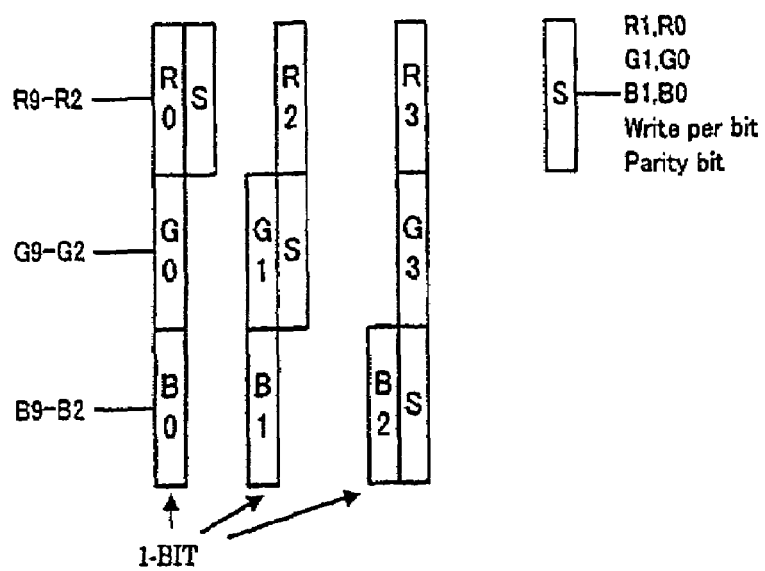
(b) BIT ASSIGN OF 30-BIT COLOR

IMAGE DISPLAY SYSTEM

CROSS REFERENCE TO RELATED APPLICATION

The invention is a continuation application of the application filed on Nov. 29, 2000, with an application Ser. No. 09/725,979, now abandoned and entitled "IMAGE DISPLAY SYSTEM, HOST DEVICE, IMAGE DISPLAY DEVICE AND IMAGE DISPLAY METHOD".

FIELD OF THE INVENTION

The present invention relates to a video interface mechanism used at the time when an image is displayed on a display panel, more particularly to a driving method, a driving device and a display device for driving a plurality of display panels and a high-resolution panel.

BACKGROUND OF THE INVENTION

A display image is generally is processed by a graphics controller of a host device composed of a personal computer (PC) and the like, and then transferred to a display device. However, owing to the recent advance of the display devices as typified by a liquid crystal display (LCD) panel, a large difference in a processing capability between the host device and the display device has emerged. For example, in the LCD panel, a high resolution of the panel itself is developed, and an ultra-high-resolution panels showing a resolution of a very high resolution, such as Quad Extended Graphics Array (QXGA, 2048.times.1536 dots), Quad Super Extended Graphics Array (QSXGA, 2560.times.2048 dots) and Quad Ultra Extended Graphics Array (QUXGA, 3200.times.2400 dots), have been put into practical use. On the contrary, system power and power of the graphics controller come to be incapable of following the advance of the panel, and a satisfactory display on the ultra-high-resolution panel is practically impossible.

Performance of an image processing system as typified by the graphics controller is limited to the QXGA level in terms of general display functions, and in a three-dimensional (3D) computer graphics (CG), as typified by home video game machines, the performance of the image processing system only can exhibit a processing capability of a resolution as low as Video Graphics Array (VGA, 640.times.480 dots). As described above, while the most advanced moving picture shows still a resolution of about the VGA level, the panels exhibiting a resolution several times to several ten times as high as the VGA comes to be manufactured, and a remarkable difference in the processing capability appears.

On the other hand, the display device as typified by the LCD panel has recently a further smaller picture frame that is a periphery of its display portion, and a so-called tiling in which a magnified panel is made by gathering a plurality of panels together comes to be possible. As a result, it is possible to further increase a resolution on the panel side, and hence a gap between the panel side and the host side appears more remarkably.

As first means for solving a deficiency of power in the graphics chip, a system constitution, for example, shown in FIG. 18 is conceived. In this system constitution, a high-resolution panel 201 on the panel side 200 is divided into four regions, and a plurality of panel control chips 202 of the number corresponding to that of the four regions are provided. Reference numeral 203 denotes a display dividing line for dividing the panel 201. On the other hand, on the host side 210, graphics chips 211 of the same number as that of the panel control chips 202 are provided, and connected to the corresponding control chips 202, respectively, via the digital interface (I/F) lines 220 of the same number as the graphics chips 211. In the graphics chips 211, the graphics memory 212 are respectively provided. Display data from an application is multi-inputted to the respective graphics chips 211 via the system bus 213. According to this technology, even though a processing capability of each graphics chip 211 is low, the display data can be processed, for example, by four graphics chips 211, and hence the problem of the processing capability can be solved.

As second means for solving a deficiency of power in the graphics chip, a method in which a memory is provided on a display device side, and a transfer speed is lowered to a technically feasible transfer rate is conceived. To be more specific, only one graphics chip is provided on the host side, and is connected to a graphics memory in which a capacity for all panels is secured. On the other hand, a panel memory is provided for the panel control chip on the monitor side. After the image data is developed in the graphics memory on the host side, the transfer speed is lowered in accordance with a shortfall of the processing capability, and then the image data is transmitted to the monitor side. The image data transmitted to the monitor side is once stored in the panel memory by means of the panel control chip, and then refreshing of the screen is performed. According to the second means, the intact refreshing rate can be adopted by lowering the transfer speed, and a high-resolution still picture can be displayed.

By adopting the foregoing means, even when a graphics chip showing a low processing capability is used, it is possible to display an image on a high-resolution panel prima facie.

However, the foregoing first means poses a first problem that an image processing of divided screens is greatly constrained, the divided screens striding the display dividing line 203 of the panel 201 shown in FIG. 18. For example, when original image data is not QXGA, the divided image data must be transmitted to the graphics chip 211 from the beginning in a state where VGA and Extended Graphics Array (XGA, 1024.times.768 dots) are magnified. Specifically, it is required that they are magnified beyond the boundary, and the image data is outputted to the magnified screen. This implies that the host side 210 splits the image data every time the resolution of the display screen changes depending on the system, and transfers the split image data to the graphics chip 211. Most of the current applications are scheduled only for an operation to write the image data onto one screen, it is substantially impossible to execute an operation to split the screen and division ally develop the image data for each chip by the current application.

As a second problem involved in the foregoing first means, because of the multi-inputs from the common system bus 213 to the respective graphics chips 211, the performance of the system bus 213 becomes a bottleneck of the processing for the whole of the system. As this system bus 213, there are two types that are a peripheral component interconnect (PCI) bus and an accelerated graphics port (AGP). The AGP has a performance eight times or higher than that of the PCI bus. In the large quantity of image data transfer, which is performed for the 3D graphics, for example, the PCI bus shows a lack of capability, and it is necessary to use the AGP exhibiting a high transfer speed. However, the AGP has no bus structure because of its high speed processing, and cannot be multi-connected to the graphics chips, so that the AGP adopts the one-to-one data processing. For this reason, in the case where the plurality of graphics chips 211 exist as shown in FIG. 18, the AGP cannot be employed, so that the performance of the system bus 213 cannot be improved.

On the other hand, the foregoing second means can solve the foregoing two problems of the system bus and the scaling of the screen discontinuity in the first means. However, although the second means can display the image data if the transfer speed is lowered to one-quarter, the reduction in the transfer speed poses a new problem. Specifically, when a moving picture is displayed, frames are missed due to the slow transfer speed. It is impossible to perform writing with the expected speed, for example, of 60 Hz. The second means cannot realize the window display in which still and moving pictures with high resolution mixedly exist.

SUMMARY OF THE INVENTION

The present invention was made to solve the foregoing technical subjects. The object of the present invention is to achieve a distribution of processing on the host side and on the panel side (monitor side), thus optimizing a workload of the whole of a system including graphics chips.

Another object of the present invention is to bring out a processing capability of an image display system including a transfer capability, thus solving a lack in a display capability onto an ultra-high-resolution panel and a multi-panel.

Still further another object of the present invention is to make it possible to perform a suitable display on an ultra-high-resolution panel also in 3D graphics for which a high transfer speed is required.

In consideration of such objects, an image display system of the present invention achieves a distribution of processings performed in a host and a display. The image display system of the present invention comprises a host for executing an application, and a display connected to the host, the display displaying an image, wherein the host transfers undeveloped image data to the display when the host requests the display to display the image; and the display includes a panel memory for developing the image, develops the image in the panel memory based on the image data transferred from said host, and displays the image on its panel, which is developed in the panel memory.

The display of the image display device refreshes the panel based on the image developed in the panel memory. With such feature of the image display device of the present invention, a power that has been consumed for refreshing on the host side (system side) can be taken over on the display side, resulting in reducing power consumption for a data transfer.

Furthermore, for example, the host transfers image data showing a first resolution to the display, based on an output from an application executed with the first resolution, and the display converts the transferred image data having the first resolution to that having a second resolution higher than the first resolution, and develops the image data for the panel memory. With such constitution of the image display device of the present invention, it is unnecessary to transfer image data, in which its scale is magnified (scaled-up), from the host. Even when the image data is magnified to four times in high-resolution displaying, an increase in a quantity of transfer data can be prevented.

Furthermore, the host transfers compressed image data to the display as it is compressed; and the display expands the compressed image data transferred thereto, and develops the expanded image data for the panel memory. Accordingly, when a screen of Digital Versatile Disc (DVD), in which compressed data is loaded, is partially displayed, a quantity of data transfer can be significantly reduced.

As one of configuration examples of the image display system, a configuration in which a host side and a display side exist in the same unit box like a notebook type PC is conceived. Moreover, conceived is a configuration in which a system device on the host side and a display device on the display side exist in different unit boxes and they are connected to each other via an interface (I/F) cable. Besides, various kinds of configurations can be conceived.

Here, to transfer the undeveloped image data is distinguished from prior arts in which image data scanned for all over the image to be outputted onto the display device is transferred.

An image display system of the present invention is capable of performing dividual processings simultaneously using a plurality of systems. Specifically, the image display system of the present invention comprises a plurality of system devices for executing the same application; and a display device having panel controlling means for dividing a display area into a plurality of areas and controlling driving of the divided areas, wherein the plurality of system devices are connected to respective panel control means provided in the display device, and output first control signals to the respective panel control means for synchronization with the display device; and the panel control means in the display device outputs a second control signals to the system devices for synchronization with the system device, based on the first control signals outputted from the system devices. According to the image display system of the present invention, in a three-dimensional (3D) moving picture display in which system power is deficient, it is possible to display a large screen and an ultra-high-resolution screen by driving of four system devices.

Note that the panel control means may be divided into a plurality of chips or constituted by one chip.

The first control signals outputted from each of the system devices are job information which can be respectively processed in a next frame by each of the system devices; and the second control signal, which is outputted from the panel control means, is information indicating a job which shows the lowest processing speed, detected from the job information, which is outputted from said system devices.

As the job information, the largest (last) job number which is executable in the next frame can be adopted.

Furthermore, the system device determines a job to be executed based on the second control signal outputted from the panel control means, and outputs image data to request a display of the display means by executing the job.

According to these constitutions, even when each divided ¼ screen is controlled by each of the four system devices, it is possible to easily control all the screen and it is possible to improve performance in a specified application. Moreover, each of the system devices can synchronize with the display device in exchanging the control signal therebetween, thus reducing complicated processings of the system side for synchronizing the system device and the display device with each other.

The image display device can develop and display mixed image on the display side in response to display requests from the plurality of applications. To be more specific, in the image display system which comprises a host for executing a plurality of applications showing different display characteristics and data quantities, which are required; and a display for displaying an image; and a digital interface for transferring image data from the host to the display, the digital interface changes a transfer format depending on an application executed by the host and transfers image data to the display; and the display develops the image data in a panel memory for developing, the image data being transferred via the digital interface, and then displays an image on a panel.

The digital interface transfers the image data by a packet, and transfers the image data by specifying a data transfer mode in the packet; and the display develops the image data in the panel memory based on the data transfer mode specified. With such constitution, there is room for an extension that the display side receives the image data transferred from the host side by different applications having different numbers of bits, resolutions, transfer modes and transfer speeds, and the like, develops the image on the panel side and displays the image.

Next, the present invention is grasped as a host device. A host device of the present invention comprises: executing means for executing a plurality of applications having different display characteristics and data quantities, which are required; window managing means for managing a window ID defined for a window that is an area which makes definite sense in an image space, of which the application is conscious; and image transfer means for adding the window ID managed by the window managing means to undeveloped image data, for which the application requests a display, and transferring the undeveloped image data.

Furthermore, the image data transfer means transfers the image data in the form of a packet, and transfers the image data after changing a transfer data format depending on the application.

With such constitution, a refreshing operation that has been heretofore performed on the host side can be placed under the control of the display side, and a processing capability of the host device can be exhibited by performing processing dividually on the host side and the display side.

A host device of the present invention comprises:

image transfer means for transferring image data to a display connected thereto; and control means for supplying image data to the data transfer means based on an executed application of a still picture and an executed application of a moving picture, wherein the control means supplies the image data with respect to the application of the still picture regardless of refresh timing required for the display, and supplies the image data in synchronization with refresh timing required for the display with respect to the application of the moving picture. According to such constitution, on the host device, for example, only a 3D (three-dimensional) work is performed. Accordingly, it is possible to improve a processing capability to be twice or more in the case of SXGA.

On the other hand, the present invention is grasped as an image display device. An image display device of the present invention comprises: a panel for displaying an image; image data receiving means for receiving undeveloped image data from a host device which executes an application; a panel memory for developing the image data received from the image data receiving means; and panel control means for developing image data for the panel memory and writing a developed image for said panel.

The image data receiving means receives a plurality of undeveloped image data showing different display characteristics and data quantities, which are required; and the panel control means develops the plurality of undeveloped image data, thus forming a display screen.

The panel control means executes refreshing for the panel based on the image data developed in the panel memory.

Furthermore, the image data receiving means receives image data having a first resolution; and the panel control means performs scaling for the image data to a second resolution different from the first resolution, and develops the image data for the panel memory.

An image display device of the present invention, which is connected to a plurality of system devices for executing the same job and displays an image based on image data transferred from the plurality of system devices, comprises: a display section for displaying the image, either as panels divided into a plurality of display areas or as one panel obtained by collecting a plurality of display panels; and panel control means for controlling an image display of the display section, wherein the panel control means receives a control signal concerning a job from the plurality of system devices, and transmits a control signal used for achieving synchronization of the system with the display device thereto. In the display section, the case where one panel is constituted by collecting the plurality of display panels and used for displaying as one panel, includes the constitution where one planar panel is constituted by tiling a plurality of display panels, and the case of a three-dimensional display panel and further the constitution in which the display panel are spatially separated from each other, e.g., in front and in rear.

The panel control means is sometimes constituted by a single chip. On the other hand, a plurality of panel control means are provided, each of which corresponds to corresponding one of divided panels in the display section or to each of said display panels constituting the plurality of display panels dealt with as one panel; and an internal bus for allowing the control signal received by specified panel control means to be recognized by other panel control means, is further provided. With such constitution, it is possible to output the control signal for synchronization of the each system device with the display device based on the control signal received by the respective panel control means.

Furthermore, the control signal received by the control means is a job number executable in a next frame by the system device. The control means transmits a control signal including a job number to be executed in the next frame by said system device, based on the job number on the bus, therefore it is possible to achieve a synchronization of the display device with the system devices by exchanging the control signal therebetween using the job number.

An image display device of the present invention comprises: a panel for displaying an image; image data receiving means for receiving undeveloped image data from a host side which executes a plurality of applications; a panel memory for developing the image data received from the image data receiving means; and panel control means for developing image data for the panel memory and for performing a color adjustment for each image data corresponding to said different applications, thus writing an image to said panel. With such constitution, it is possible to control a conversion of a color adjustment for each window, such as gamma correction, with respect to image data divided for each window that is a transfer processing unit for each application.

An image display device of the present invention comprises a panel for displaying an image; image data receiving means for receiving color image data of a first number of bits and monochrome image data of a second number of bits different from the first number of bits from a host side; a panel memory for developing the image data received from the image data receiving means; and panel control means for developing image data for said panel memory, wherein the panel control means develops the color and the monochrome image data, which are received from the image data receiving means, in the panel memory in different data formats. According to the constitution of the image display device of the present invention, it is possible to display different types of images simultaneously on the panels. The panel control means may have also a feature in that identifying bits are written to the panel memory for identifying the color image data and the monochrome data, and the developing processing is executed based on the identifying bits.

An image display method of the present invention for displaying an image on a display connected to a host, based on a signal from the host which executes an application, comprises the steps of transferring image data undeveloped for displaying an image from the host to the display via a digital interface; developing the transferred image data into a memory of the display, by the display itself; and displaying the image developed in the memory, onto the display.

If refreshing of the display is performed based on the image developed in the memory of the display, for example, it is possible to perform the processing such as refreshing dividually by the host side and the display side, and hence it is unnecessary to transfer a large quantity of developed image data from the host side to the display side every time the refreshing is performed.

An image display method of the present invention for displaying an image on a display connected to a host, based on a signal from the host which executes an application, comprises the steps of transferring image data from the host to the display, the image data being executed with a first resolution by the application; scaling the image data showing the first resolution by the display, which is transferred from the host; developing an image with a second resolution different from the first resolution by the display; and outputting the image to a panel of the display so as to display the image on the panel.

The display panel is a multi-panel in which a plurality of panels are tiled or a high-resolution panel with a high resolution, and scaling of the image data is an enlarged display.

BRIEF DESCRIPTION OF THE DRAWINGS

For a more complete understanding of the present invention and the advantages thereof, reference is now made to the following description taken in conjunction with the accompanying drawings:

FIGS. 7(*a*), 7(*b*) and 7(*c*) are explanatory views showing a comparison of a data transfer in the prior art with that in this embodiment, and a data format;

FIGS. 9(*a*) and 9(*b*) are explanatory views for explaining a processing for each data and a processing quantity;

FIGS. 17(*a*) and 17(*b*) are diagrams showing data format examples of a digital I/F line.

DETAILED DESCRIPTION OF THE PREFERRED EMBODIMENT

Figure 8:
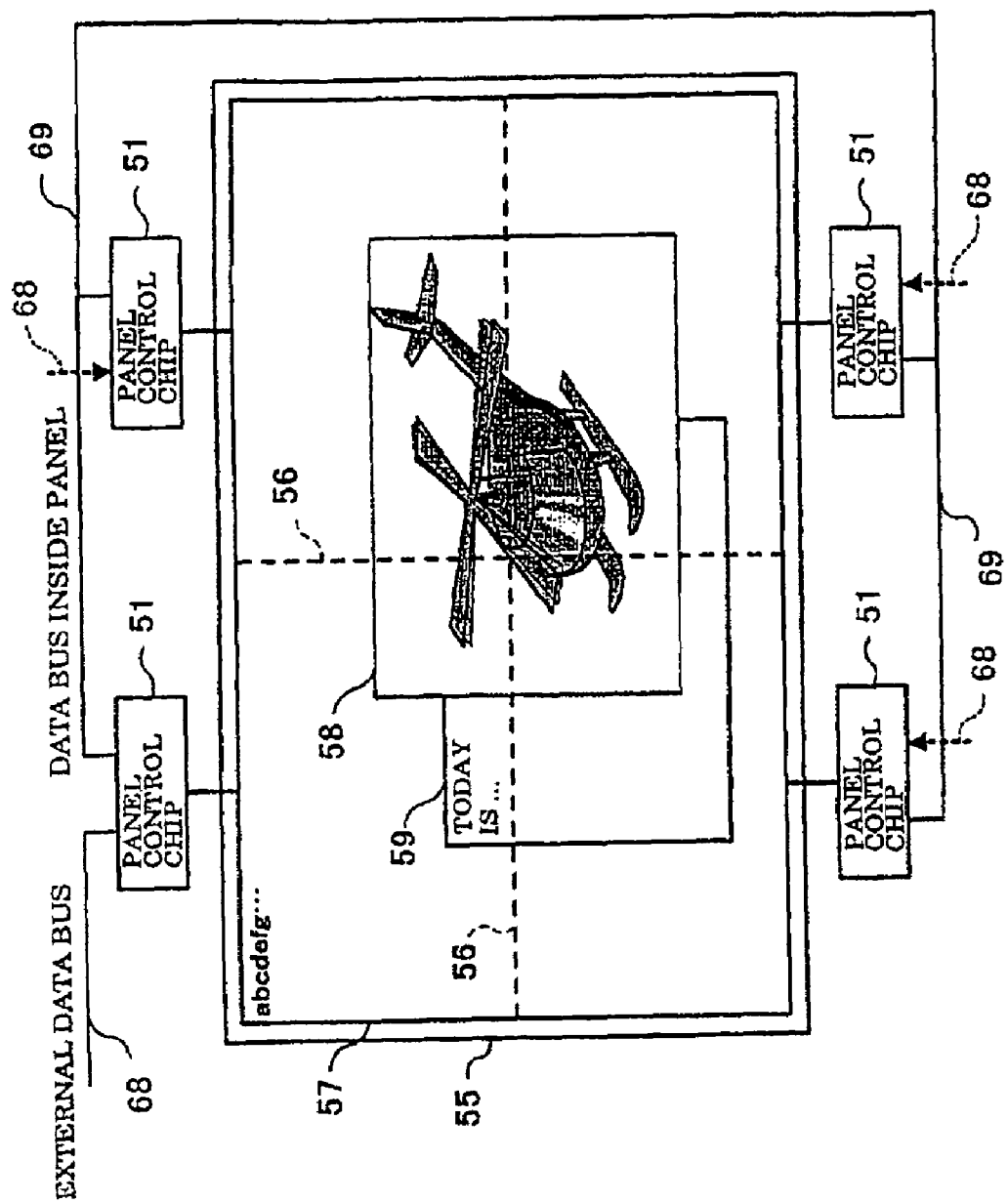
FIG. 8 is an explanatory view for explaining a constitution of a display screen in this embodiment.

Prior to detailed descriptions for a constitution of the image display device of the present invention, a constitution of the display screen to which the embodiment is applied will be described with reference to FIG. 8 briefly.

A panel 55 that is the display screen is a high-resolution liquid crystal display panel of, for example, QUXGA (3200.times.2400 dots). In the example of FIG. 8, the panel 55 is divided into four sub-panels by display dividing lines 56. The image developing onto these panels is driven by each of later described separate panel control chips 51. This is because in the actual panel 55 too many dots are to be processed and only one panel control chip 51 cannot drive the panel 55. One of the panel control chips 51 is connected to an external data bus 68, and each panel is connected to an intra-panel data bus 69. The external data bus 68 connected to the panel control chip 61, which is represented by dotted lines, is used for external input to each of the sub-panels from each system provided outside the display screen when a multi-system later described in an embodiment 2 is adopted.

In this embodiment, a concept of a window is introduced. The window means an area which makes definite sense on an image space, of which the host is conscious, and a unit of a transfer processing of image data. In FIG. 8, a window 58 for displaying a three-dimensional (3D) moving picture screen and a window 59 used for a text display are illustrated. As shown in FIG. 8, when it is tried to display text characters with a high resolution of 200 dpi (dot per inch) on the display screen 57, the size becomes one fourth since a resolution of a screen is usually 100 dpi. Therefore, in the text display, the text characters are displayed using a larger font having a four-hold size. On the other hand, with respect to the 3D moving picture screen displayed by the window 58, the data is originally made by VGA (640.times.480 dots), and the 3D moving picture is displayed so as to have a 2.5-fold size vertically and horizontally, namely with 1600.times.1200 dots.

FIGS. 9(*a*) and 9(*b*) are explanatory views for explaining processing for each data and a data processing quantity. FIG. 9(*a*) shows a systematic view showing a data source and each constituent component for processing the data. In FIG. 9(*a*), pre-handlers 26 to be described later, which correspond to respective applications, such as text data, 3D animation, 32-bit color image and a DVD, are provided in a pre-processor 20 in a graphics chip 11 on the host side. The image data from the pre-handler 26 passes through an I/F transceiver 15, and is transmitted out to the panel side via a digital I/F line 49. On the panel side, the image data is inputted to a later described post-handler 78 in the panel control chip 51 via an I/F receiver 53. The post-handler 78 is a processing unit in charge of processing one window, and processing for the window is executed by the post-handler 78. Thus, the image is displayed on the panel 55.

On the other hand, FIG. 9(b) shows a state where the data band width is limited in the prior art in which image data is developed on a host side and the developed image data is transferred to a panel side. In FIG. 9(b), image data is developed in a graphics memory 212 by a graphics chip 211 on the host side. The image data passes through the I/F transceiver 15 and is transmitted to the panel side via a digital interface (I/F) line 220 at a refreshing timing on the panel side. On the panel side, the image data is transferred to a panel control chip 202 via the I/F receiver 53, and displayed on a panel (not shown).

Processing of 3D animation as typified by, for example games, is practically performed at most with a VGA resolution. Such resolution is not satisfactory, and a further increase in processing capability is expected. Processing capability several ten times as much as the VGA resolution is required for processing a display screen having a resolution equal to a UXGA resolution or more, as refreshing data quantity for generating the screen for the panel 55 with a resolution of QUXGA (3200.times.2400 dots), 3200.times.2400.times.24 (8 bits for each of R, G and B).times.60 [Hz].times.2.5=3.45 [G byte/s] is required. Incidentally, in the prior art shown in FIG. 9(b), the maximum processing capability is determined by the bus widths of the graphics chip 211, the graphics memory 212 and the panel control chip 202. In general, as the processing capability, 128 bits.times.144 [MHz].times.=2.3 [Gbyte/s] is maximum. Actually, 90% of 2.3 [Gbyte/s] is the maximum capability that can be used. Accordingly, when the panel 55 is a high-resolution screen, it is very difficult to develop the memory processing chip.

On the other hand, in this embodiment shown in FIG. 9(a), since the screen of the panel 55 can be driven by dividing into the sub-panels, the number of the panel control chips 51 can be increased in accordance with the number of the sub-panels. When the panel 55 is divided into, for example, four sub-panels and processed, the processing data quantity can be reduced to ¼ for one panel control chip 51.

Moreover, as described above, for the 3D animation, for example, it is desired to increase the polygon number that can be processed. On the other hand, in a still picture such as a text screen, a further high-resolution display screen is desired rather than the high processing speed. To be more specific, since the text screen intends to be read by human beings, lowering of the writing rate to about 20 [Hz] has no affect. On the contrary, if the text screen is made with a high resolution, it may be more beautiful than printed materials. As described above, the processing style required varies significantly depending on the display data. The whole of the display data is not processed in the same processing style, and if the display data is processed by the best processing style according to a sort thereof, the processing capability is greatly improved as a whole.

For this reason, the concept of the window is introduced in this embodiment. In this embodiment, the data format is sorted, and the distributed processing is performed, thus solving the foregoing problems. Specifically, as shown in FIG. 9(a), a window for the 3D animation is generated with, for example, a VGA resolution, and its 2.5-fold enlarged display is performed. At the same time, the SXGA screen showing a slow transfer speed of, for example, 30 [Hz] can be updated. In the conventional display system shown in FIG. 9(b), the transfer speed between the graphics chip 211 and the graphics memory 212 must be about 3 [Gbyte/s]. Moreover, the transfer speed of 1.5 [Gbyte/s] is necessary for the digital I/F line 220, and four sets are necessary when a DVI interface is used. On the contrary, in this embodiment, the half of the transfer speed of VGA and SXGA is satisfactory for the digital I/F line 49, and its transfer speed is 300 [Mbyte/s], which is ⅕ of that of the digital I/F line 220. The transfer speed between the panel control chip 51 and a panel memory to be described later on the panel side is 1 [Gbyte/s] or less, which is satisfactory.

Figure 10:
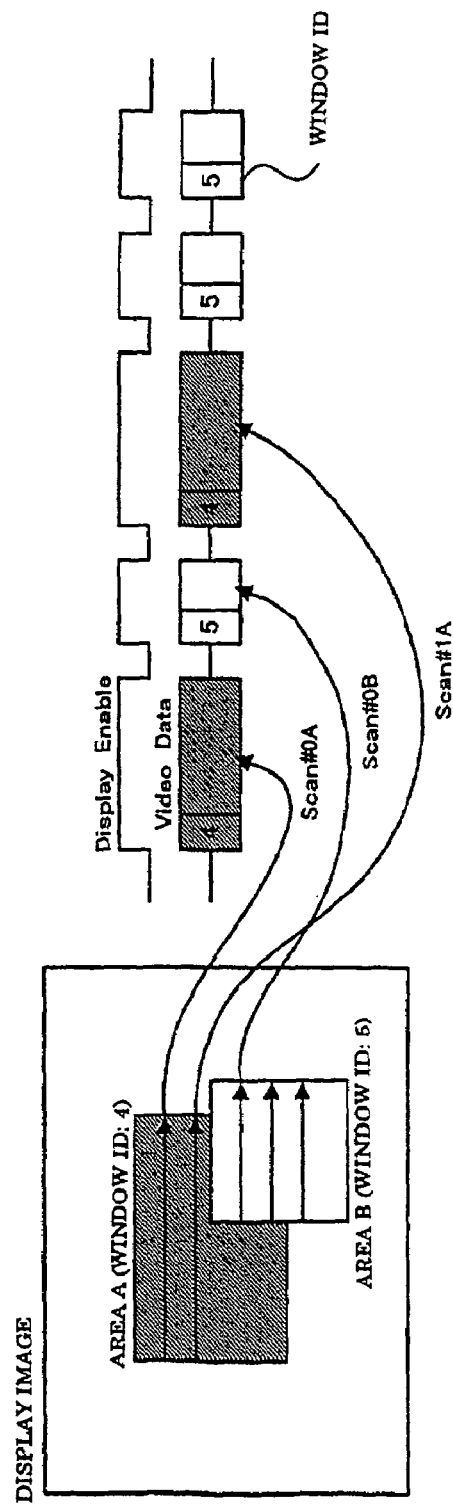
FIG. 10 is an explanatory view for explaining a transfer method for transferring image data using a packet used in this embodiment.

FIG. 10 is an explanatory view for briefly explaining a transfer method of image data using a packet used in this embodiment, in conjunction with the foregoing window. It is now assumed that an area A and an area B exist as an image generated by an application on the host. In this embodiment, a developing operation of the image is not executed on the host side 10 to be described later, but executed on the panel side 50 to be described later. On the host side 10, a window ID: 4 is set for the area A and a window ID: 5 is set for the area B. The transfer of the image information to the panel side 50 is executed in a packet method in which the image information is sorted for each area. To be more specific, an image signal is transferred after, for example, packetizing of the image signal at each scan, in response to a Display Enable signal. ID information is added to each packetized image signal, and then the packetized image signal is transferred. If each handler to be described later in a specified sub-panel is set so as to process the window ID: 4 and the window ID: 5, the image information, which is transferred in the form of a packet and to which the window ID is added, can be developed on a specified panel. Note that the data transfer in the form of a packet will be described later in detail.

The embodiment of the present invention was described conceptionally as above. Next, constitutions of constituent components in this embodiment will be described in detail.

Figure 1:
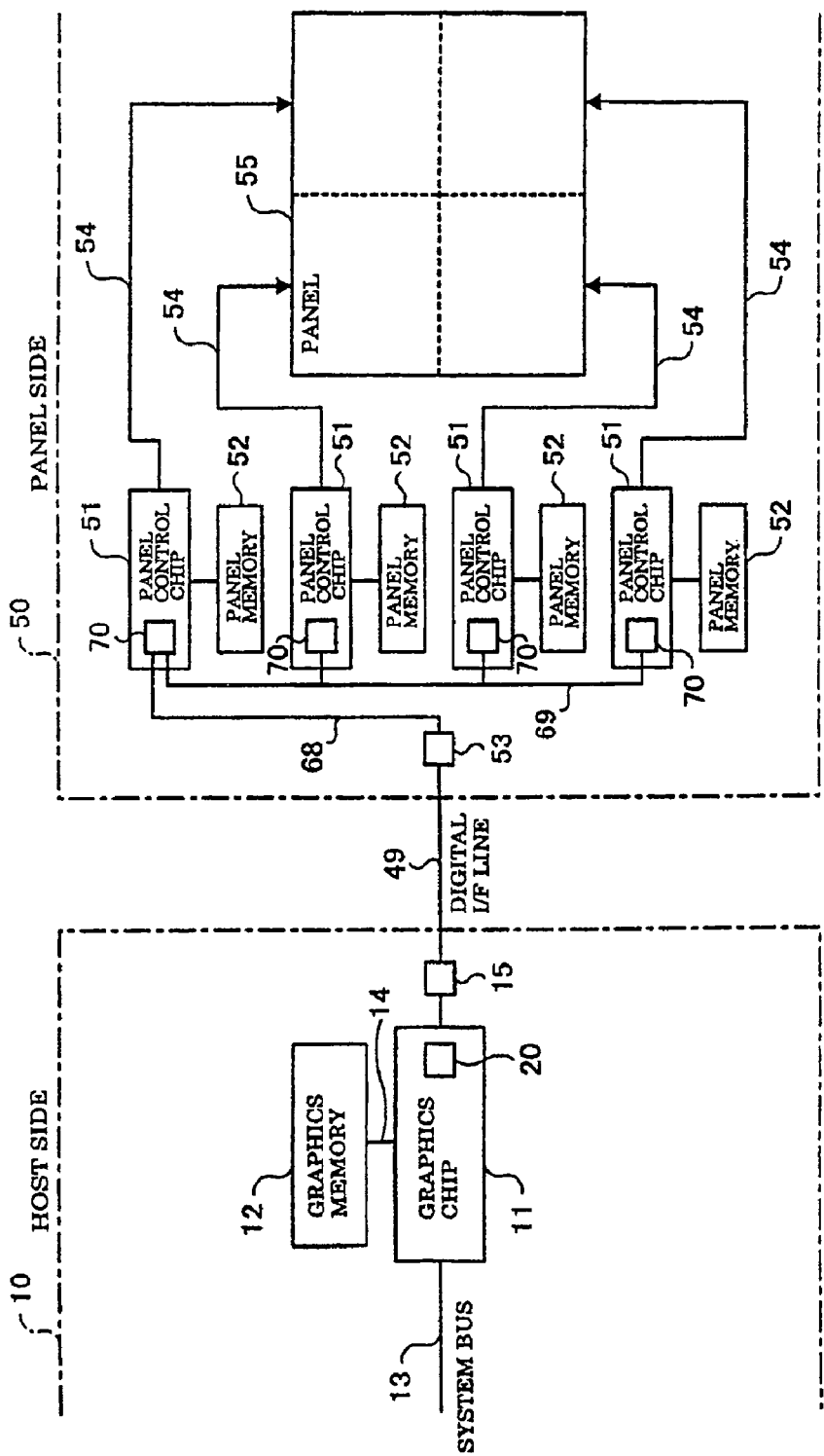
FIG. 1 is a block diagram showing an embodiment of an image display system to which the present invention is applied.

FIG. 1 is a block diagram showing an embodiment of the image display system to which the present invention is applied. Referring to FIG. 1, reference numeral 10 denotes a host side composed of a personal computer (PC and the like), which serves as a driver for driving the display device in this embodiment. In this host side 10, reference numeral 11 denotes a graphics chip, and a pre-processing of the image data is executed by a pre-processor 20 built in the graphics chip 11. Reference numeral 12 denotes a graphics memory, which is constituted by a smaller capacity compared to conventional ones because the graphics chip 11 needs not perform continuous refreshing by a later described distributed processing. Reference numeral 13 denotes a system bus connected to a host system (not shown) for executing an application. Reference numeral 14 denotes a graphics memory bus arranged between the graphics chip 11 and the graphics memory 12. Furthermore, reference numeral 15 denotes an interface (I/F) transceiver, which serializes the image data and transmits the image data to the panel side 50 through the digital I/F line 49.

On the other hand, a plurality of panel control chips 51, each having a post-processor 70 therein, are provided on the panel side 50. In FIG. 1, in accordance with the division of the panel 55 into four areas, the divided panel 55 is driven by use of the four panel control chips 51. Reference numeral 52 denotes a panel memory provided in each panel control chip 51. Reference numeral 54 denotes a panel data outputted for transmitting the output from the panel control chip 51 to the panel 55. Moreover, reference numeral 55 denotes a panel for actually displaying an image, and the panel 55 is divided into the four areas in FIG. 1. This panel 55 is constituted by a high-resolution panel, and to support this high-resolution screen, the panel control chip 51 makes it possible to perform plural parallel processings. Moreover, reference numeral denotes an external data bus, and reference numeral 69 denotes an intra-panel data bus.

This embodiment has a feature in that the pre-processor 20 in the graphics chip 11 executes pre-processing of the data and the post-processor 70 in the panel control chip 51 executes post-processing. Thus, the job concerning the image generation, such as mixing of the image data and refreshing of the screen and the like, is executed by the display device side (panel side 50), the job having been executed by the graphics chip 11 on the host side 10. Specifically, a tag, an attribute of the image data and an error protection are added to the undeveloped image data by the pre-processor 20 or to the unmixed image data, in other words, and the post-processor 70 first develops the image data in the panel memory 52. In other words, the post-processor 70 uncompresses the image data and mixes, then the post-processor 70 transfers it to a refreshing circuit (not shown).

A flow of general image data processing in this embodiment will be described.

The graphics chip 11 on the host side 10 performs reading/writing from/to the graphics memory 12 through the graphics memory bus 14. An application system (not shown) for executing an application is handled by use of the system bus 13. The foregoing AGP is adopted for the system bus 13. Although this AGP has performance doubled to eightfold that of the conventional PCI bus, the AGP is not a bus, only one AGP becomes active in the system. A digital output of the graphics chip 11 is sent to the I/F transceiver 15, and serialized and transferred with a high speed therefrom.

The image data serialized by the I/F transceiver 15 is transmitted to the I/F receiver 53 on the reception side via the digital I/F line 49. This I/F receiver 53 converts the serialized image data back to the original parallel video data. The image data converted to the parallel data is transmitted to the panel control chip 51. In the panel control chip 51, the image data packetized as described later is first uncompressed by the post-processor 70, and a window ID to be described later is recognized. A data operation in accordance with the window ID is performed, then the image data is developed and stored in the panel memory 52. On the other hand, the panel control chip 51 sequentially reads out the display data from the panel memory 52, and sends out the read-out display data to the panel 55.

As described above, in this embodiment, the greater part of the jobs concerning display processings are performed by the post-processor 70 and circuits located at the rear stage thereof, the jobs which including image data developing, refreshing for displaying, timing generation in the horizontal (H)/vertical (V) direction, allocation of memories depending on a screen size of the display device and allocation of the number of colors. These processings have heretofore been performed by the graphics chip 11. As described above, because a load of the graphics chip 11 on the host side 10 is reduced and the display processing is performed by the panel control chip 51 which can be constituted by a multi-chip, the system of this embodiment is capable of functioning sufficiently as a technique for displaying a high-resolution display. Moreover, in the graphics chip 11, the image data is simply processed, for example, with the VGA resolution, and processed so as to magnify it by the panel control chip 51. Accordingly, it is possible to display a moving picture such as 3D graphics.

Figure 2:
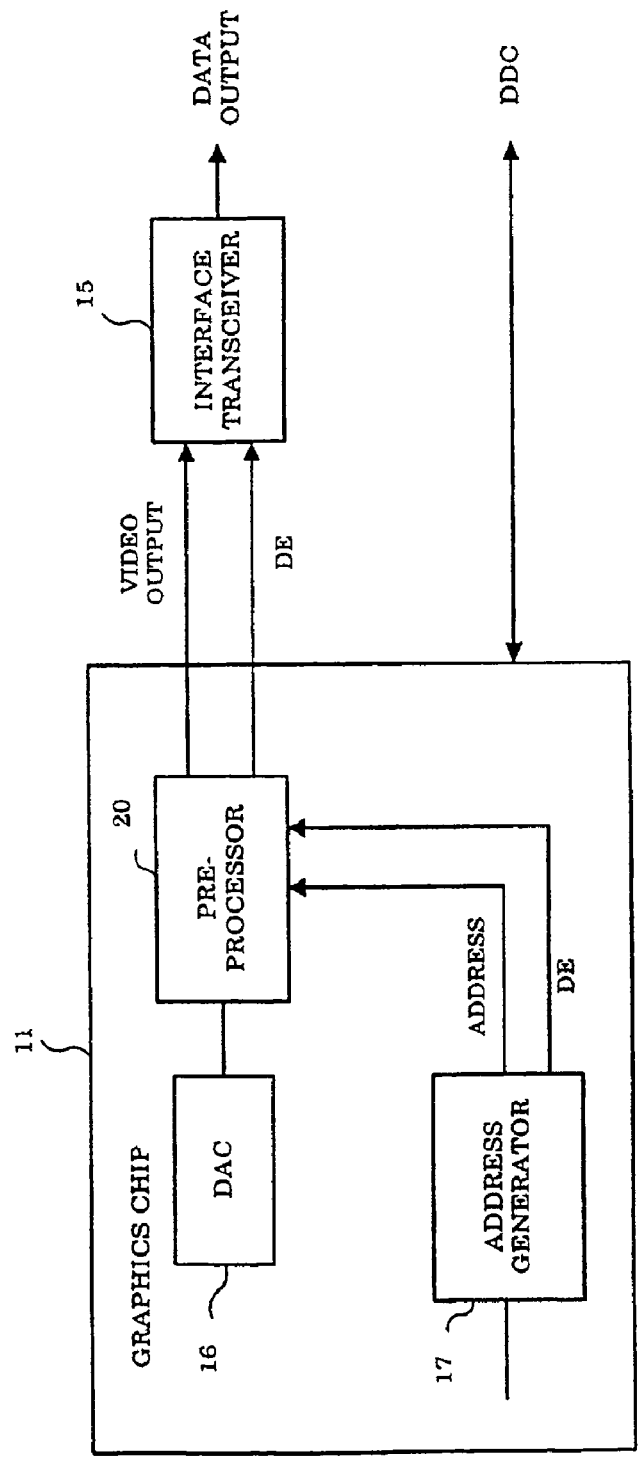
FIG. 2 is a diagram for explaining a graphics system on a host side which is explained in FIG. 1.

FIG. 2 is a view for explaining the graphics system on the host side 10 which was described in FIG. 1. In the graphics chip 11, a D/A converter (hereinafter referred to as a DAC) 16 and an address generator 17 for generating synchronized signals are provided. In the prior art, the address generator 17 outputs the synchronized signals including H-Sync and V-Sync together with the display enable signal, as the form that can be immediately displayed in the display device. This embodiment is constituted such that processing to be executed by the graphics chip 11 is reduced, the image data is not developed and the undeveloped image data is transferred to the panel side. Color data composed of, for example, 24 bits is outputted to the pre-processor 20. Moreover, a DE signal for indicating data valid, that is, indicating that the data is sent, and an address signal for setting a start point, are outputted from the address generator 17 to the pre-processor 20. The pre-processor 20 executes processing for adding a window ID and address information to the image data. For information exchange between the host side 10 and the panel side 50, a 12C base interface known as Display Data Channel (DDC) is used. Control signals are transferred between the host side 10 and the panel side 50 through this interface.

Figure 3:
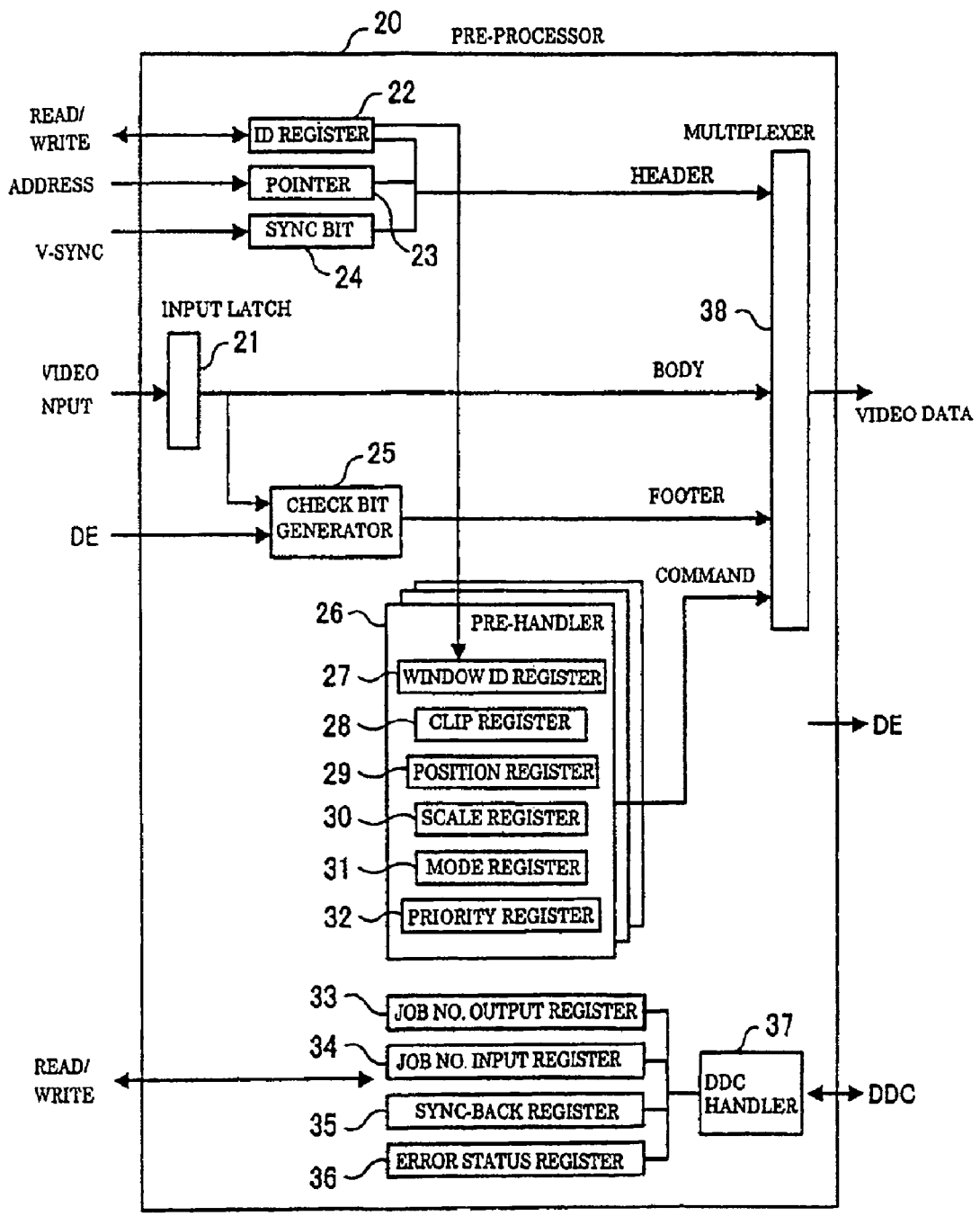
FIG. 3 is a block diagram showing an internal constitution of a pre-processor 20.

FIG. 3 is a block diagram showing an internal structure of the pre-processor 20. An input latch 21 latches video data inputted from an application thereto. In an ID register 22, a window ID to be added to the packet is set, and a pre-handler 26 corresponding to this window ID is selected. For packetizing, the pointer 23 converts simple information such as an address and an order of data. The sync bit 24 is a bit for making synchronization of the display screen with the writing data. A synchronization of a vertical counter of the display screen is made in response to this bit. Upon receipt of data inputted from the input latch 21 and a Display Enable signal indicating data valid, the check bit generator 25 generates check bits of the image data including parity, sum and CRC.

Moreover, the pre-handler 26 is a handler on the pre-processor 20 side, and has data for each window ID. Here, the handler means a processing unit in charge of processing one window, and is provided also in the post-processor 70 on the panel side 50, to be described later. The handler has various kinds of registers. A window ID register 27 shows an ID indicating to which window each handler in the pre-handler 26 corresponds. A clip register 28 is a register indicating an actually writable area. A position register 29 indicates a position of the transfer data. A scale register 30 is a register indicating a magnifying power for scaling the image data. A mode register 31 indicates a transfer mode and a writing mode of the image data. A priority register 32 indicates a priority for each window ID.

A DDC handler 37 transmits/receives a control signal of DDC between the host side 10 and the panel side 50. A job number output register 33 is a register for writing the job number, and the job number is transmitted to the panel side 50 via the DDC handler 37. In a job number input register 34, the smallest job number in all is read thereinto via the DDC. The job number is used for making synchronization when a multi-system constitution is adopted as is described in a later described second embodiment. A sync back register 35 is used for making synchronization with the panel side 50, and is constituted such that normalized vertical information of the panel side 50 can be read. An error status register 36 is constituted such that error information processed on the panel side 50 is returned to the host side 10.

Furthermore, a multiplexer 38 multiplexes header information from the ID register 22, the pointer 23 and the sync bit 24, body information that is video image data from the input latch 21, footer information from the check bit generator 25 and a command from the pre-handler 26, and packetizes them to transfer them to the panel side 50.

Figure 4:
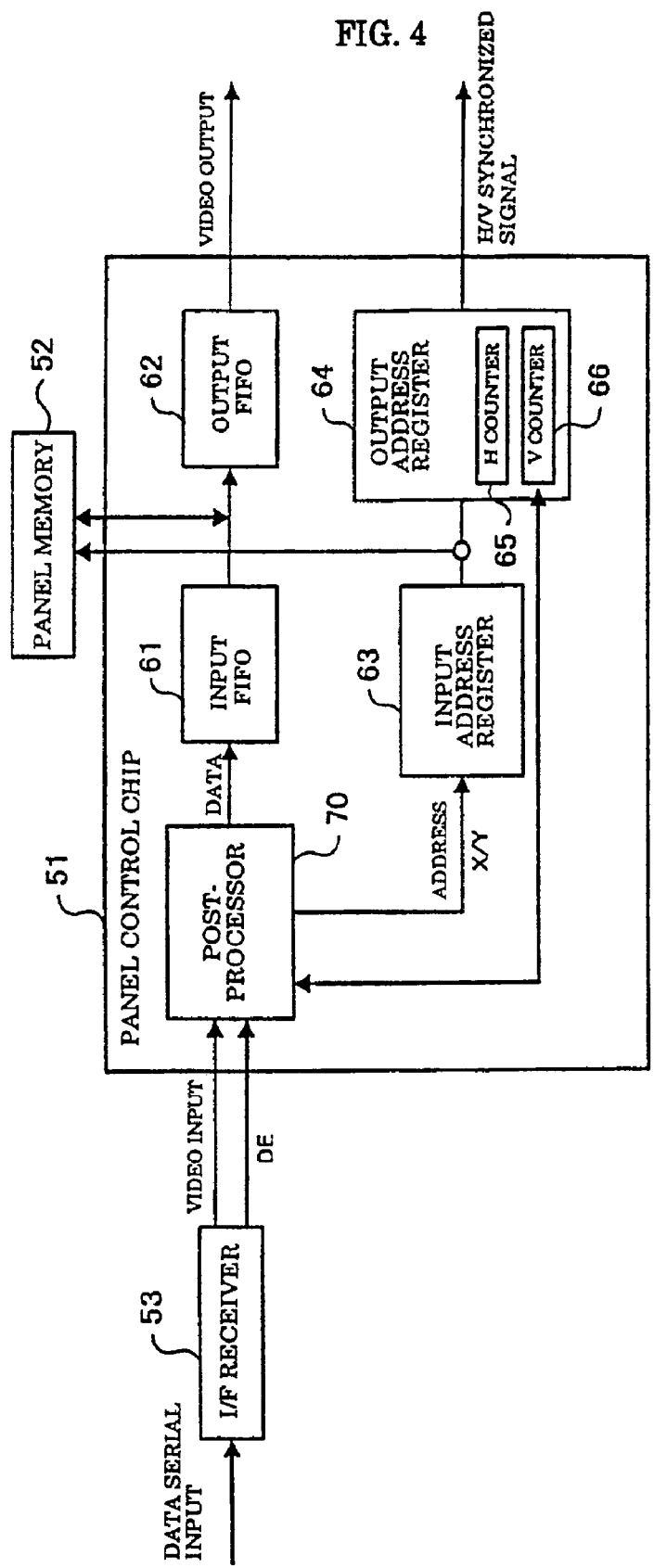
FIG. 4 is a block diagram showing a schematic constitution of a display circuit on a panel side 50.

FIG. 4 is a block diagram showing a schematic constitution of a display circuit on the panel side 50. The panel control chip 51 comprises a post-processor 70, an input FIFO 61, an output FIFO 62, an input address register 63, and an output register 64 having an H counter 65 and a V counter 66. The image data which is serialized and transferred from the host side 10 is converted to parallel image data and a control signal DE by the I/F receiver 53. The data from the I/D receiver 53 adopts the form of packet unlike the prior art, and is uncompressed and processed by the post-processor 70. The post-processor 70 is provided within the panel control chip 51 on the panel side 50, and processes the packet transmitted from the host side 10. Processing such as scaling is one of the processings executed by the post-processor 70. The image data is read out from the panel memory 52 and written thereto while timing its reading-out and writing by the input FIFO 61 and the output FIFO 62, and then transmitted to a next processing. Here, the image data processed by the post-processor 70 is X/Y address, and is converted to memory address by the input address register 63. The memory address which is converted from the image data is inputted to the panel memory 52 and the output address register 64. The output address register 64 comprises the H counter 65 and the V counter 66, and outputs synchronized signals in the horizontal/vertical directions to the panel 55. Conversion of the display mode is executed by the post-processor 70.

Figure 5:
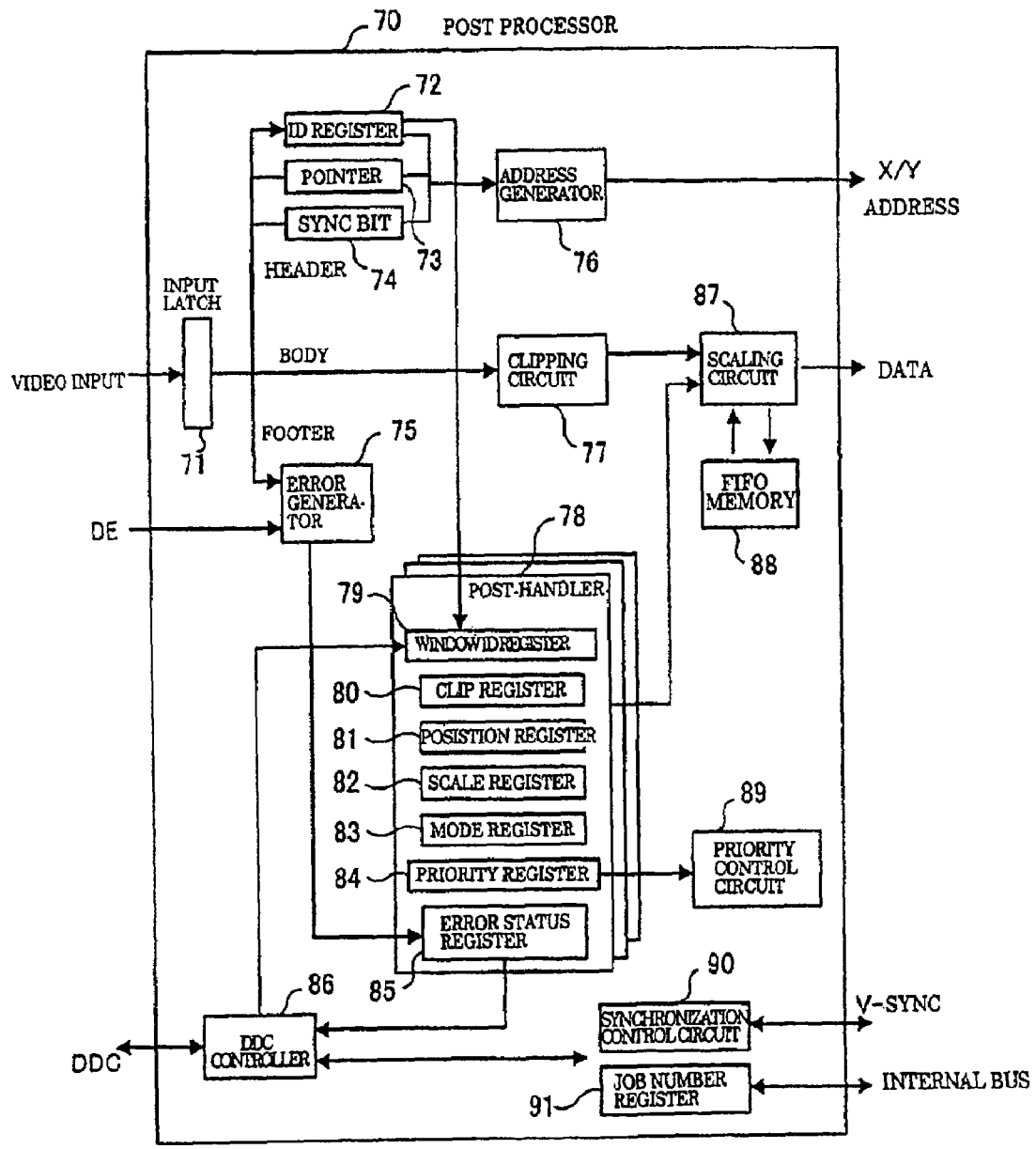
FIG. 5 is a block diagram showing an internal constitution of a post-processor 70.

FIG. 5 is a block diagram showing an internal constitution of the post-processor 70. An input latch 71 latches packet data inputted thereto. A window ID stored in the packet is set in an ID register 72. A pointer 73 converts simple information such as packetized addresses and information relating to data order. A sync bit 74 is a bit for making synchronization of the display screen with writing data. Synchronization of the vertical counter for the display screen is made in response to this bit. An error generator 75 detects a data error based on check bits of the data. On the other hand, an address generator 76 generates addresses from pointers and packet information from the ID register 72, the pointer 73 and the sync bit 74. A clipping circuit 77 is constituted to detect a writable area from the clip register 80 in the post-handler 78 and the priority control circuit 89, and to cut out data of that portion for the image data from the input latch 71.

The post-handler 78 is a handler on the post-processor 70, and functions as a processing unit in charge of processing the window. A window ID register 79 in the post-handler 78 indicates a window ID of a packet to be processed by each handler in the post-handler 78. The clip register 80 is a register indicating an actually writable area. A position register 81 indicates a position of the transfer data. A scale register 82 is a register indicating a magnifying power for scaling the image data. A mode register 83 indicates a transfer mode for the image data and a writing mode for the image data. A priority register 84 indicates a priority of a clip area of each handler. An error status register 85 is a register showing an error status in processing on the panel side 50.

Furthermore, a DDC controller 86 executes processing of a DDC control signal transmitted/received between the host side 10 and the panel side 50. In the scaling circuit 87, the image data outputted from the clipping circuit 77 is magnified and reduced, and outputted to the panel 55. A FIFO memory 88 is a memory used for magnifying/reducing the image data in the scaling circuit 87. A priority control circuit 89 sets a writable area of the image data for the window ID based on a processing area (clipping area) of the respective post-handler 78 and each priority. Moreover, a synchronization control circuit 90 is a circuit which uses the normalized vertical counter and is used for making a vertical synchronization of the panel and for a synchronization of data processing. The synchronization control circuit 90 outputs a vertically synchronized signal. A job number register 91 is connected to an internal bus that is a low speed bus, and is used when a multi-system is adopted. The job number register 91 stores the smallest job number.

Figure 6:
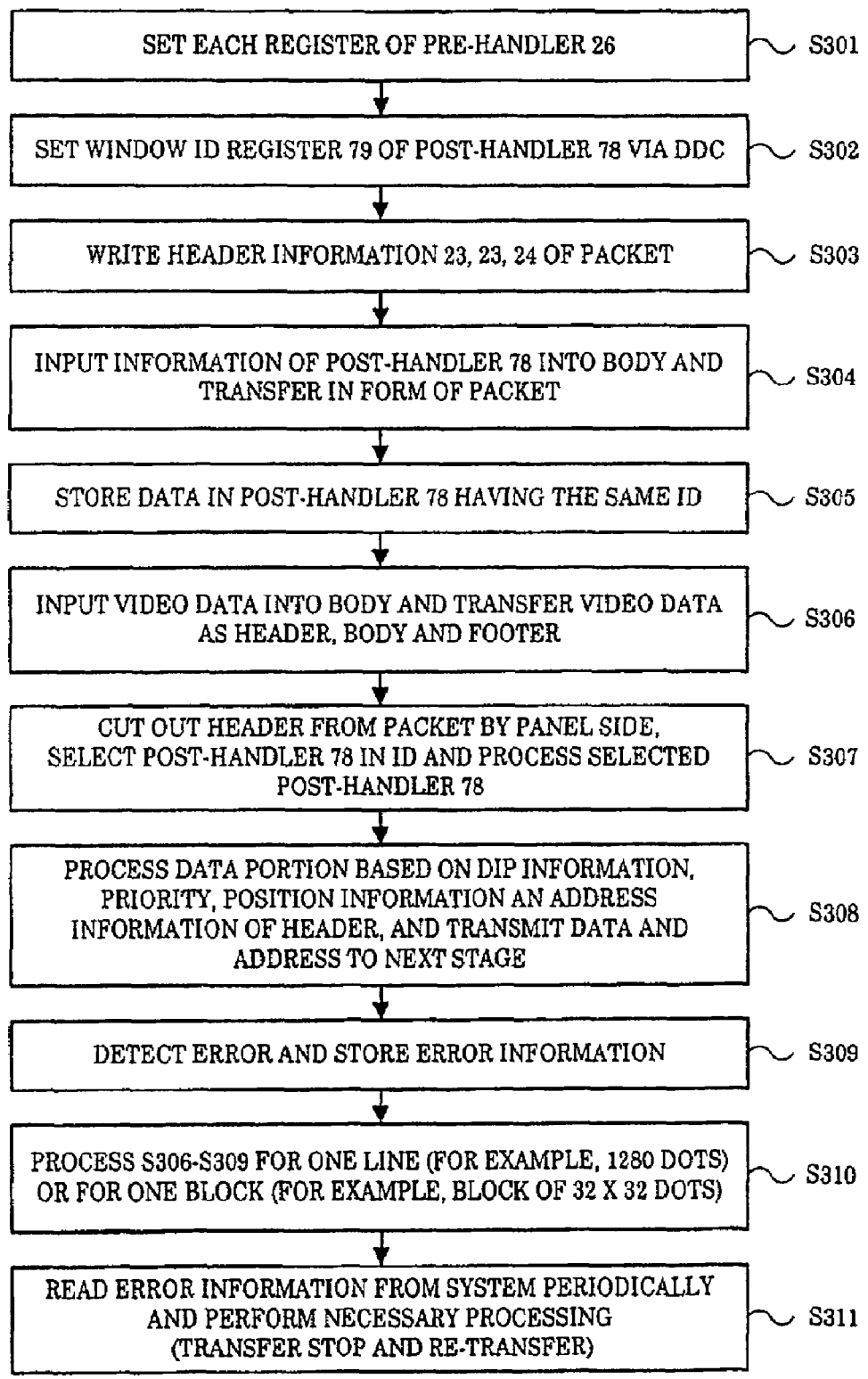
FIG. 6 is a flowchart showing processing performed by the pre-processor 20 on the host side 10 and the post-processor 70 on the panel side 50.

Here processing executed by the pre-processor 20 on the host side 10 and the post-processor 70 on the panel side 50, will be described with reference to the flowchart of FIG. 6 briefly.

First, each register of the pre-handler 26 in the pre-processor 20 is set in accordance with a window by an application (step 301). This information is transferred to the post-processor 70 via the DDC handler 37 by the DDC control signal, and the window ID register 79 of the post-handler 78 is set (step 302). On the other hand, the ID register 22, the pointer 23 and the sync bit 24 are written as header information of a packet, which is used when the image data is transferred (step 303). Furthermore, the pre-processor 20 transfers information of the post-handler 78 in the form of a packet after allowing the information of the post-handler 78 to be included in a body of the packet (step 304). The transferred data is stored in the post-handler 78 having the same ID as the transferred data (step 305).

Next, the video data is inputted to the packet body, and the video data is transferred from the system in the form of header-body-footer (step 306). The panel side 50 first cuts out the header from the packet, and then selects the post-handler 78 corresponding to ID in the header. Processing is executed by the selected handler (step 307). A data portion is processed based on clip information, and its priority, position information and address information of the header. Thereafter, data and an address are sent to the next stage (step 308). At the same time, an error detection is executed, and error information is stored (step 309). The processings executed from step 306 to step 309 are executed for each line (for example, 1280 dots) or for each block (for example, a block of 32.times.32 dots) (step 310). Error information is read from the system on the host side 10 via the DDC, periodically, and a necessary processing such as transfer stop and re-transfer is performed (step 311).

FIGS. 7(*a*), 7(*b*) and 7(*c*) are explanatory views showing a comparison of a data transfer of the prior art with that of this embodiment, and a data format.

FIG. 7(*a*) shows a conventional transfer of video data. In the conventional transfer, video data of R(Red), G(Green) and B(Blue), V-sync, H-sync, DE and other about two control signals are serially sent out. The video data is sequentially transferred one line by one line from upper left to lower right in accordance with the display screen. Furthermore, during the data transfer, a period in which no data is transferred exists as a blanking time. On the other hand, there is a read path having a reading speed as slow as 100 [kHz], which sends out a DDC control signal from the panel to the host.

A transfer of video data in this embodiment shown in FIG. 7(*b*) utilizes a blanking time in the conventional transfer. Information of 16 dots or less is added to the header and the footer. This is called packetization. Since packets from a plurality of sources are dealt with in this embodiment, a synchronized signal of V-sync and H-sync does not make sense, so that the V-sync information is included in the header. Accordingly, one DE that is a signal indicating a quantity of data transfer is satisfactorily used as the synchronized signal. This synchronized signal is used for error processing in this embodiment. A quantity of information processed by the DDC increases, and bidirectional use is adopted. Furthermore, the quantity of data is not invariable.

In this embodiment, data format is considered so as to make it similar to that of the prior art. This is because in consideration of the case where the conventional PCs and the conventional monitoring apparatus are placed on the market, to keep compatibility of the appliance of this embodiment with that adopting the conventional system is intended. To minimize the change of the graphics chip, this embodiment is considered so as to be able to be supported without changing the data format so much.

The data format in this embodiment is shown in FIG. 7(c). The body is an ordinary image data portion, and variable in length. The header portion includes a window ID corresponding to a name tag of the image data, a pointer indicating a write position, and a synchronous bit in lieu of V-sync. A footer exists in the final packet bit, and is used for the error detection. This is because since data is transmitted via a transmission system, the case where a phase error may occur is considered.

As described above, according to this embodiment, it is possible to move the screen refresh work toward the display device side (panel side 50) and reduce the work load by scaling the image data in the display device. When a window display is performed in the ultra-high-resolution panel, characters and the like must be naturally displayed with a high resolution, and they must be displayed with a high resolution also in the case of a still picture. However, since performance of the CPU side is not satisfactory in the case of a 3D display for games, a screen with VGA resolution is displayed, for example. According to this embodiment, by separating these two portions, the portion of the still picture is refreshed using a memory on the panel side 50. Accordingly, since the system side (host side 10) performs only the 3D work, processing capability can be increased to be double with respect to, for example, SX GA. Moreover, for the display of the 3D display portion with a resolution of VGA (640.times.480 dots) and at a size of XGA (1024.times.768 dots), data transfer has been heretofore performed after scaling up the image data to about 1.5 times on the system side. According to this embodiment, it is possible to process this work on the panel side 50. Particularly, when image data is magnified by four times with a ultra-high-resolution, and under strict conditions relating to power consumption charged on, fore example, notebook type personal computers, such idea is particularly a large merit.

Embodiment 2

In the embodiment 1, descriptions for the case where the display device is driven by use of the single graphics chip 11 on the host side 10 were made. In the embodiment 2, a display technique by a so-called multi-system, in which the display device is driven by use of a plurality of graphics chips 11 on the host side 10, will be described.

The same reference numeral is used for the same function as those in the embodiment 1, and detailed descriptions for them are omitted.

The display processing of moving pictures by the multi-system in this embodiment has roughly two features.

One is that as described in the embodiment 1, not only each system controls the corresponding one of the screens divided, but also one system can control the whole of the screen. In the prior art, since the respective systems control the respective screens, the OS of one system can control only ¼ of the whole of the screen, but cannot control the whole of the screen. According to this embodiment, one system can perform an ordinary window processing. At the same time, such a constitution is possible in that only for a specified 3D window, a support is made by a plurality of systems.

The other feature is the difference in the ways how to get synchronization. Up to now, the system had a high speed LA and a special communication means, and the plurality of systems heretofore has been synchronized with each other by the high speed LA and the communication means. However, this method has been complicated, and highly interdependent among the systems. On the other hand, in this embodiment, it is possible to allow the plurality of systems to be synchronized with each other during the communication with the display device (panel side 50).

Figure 11:
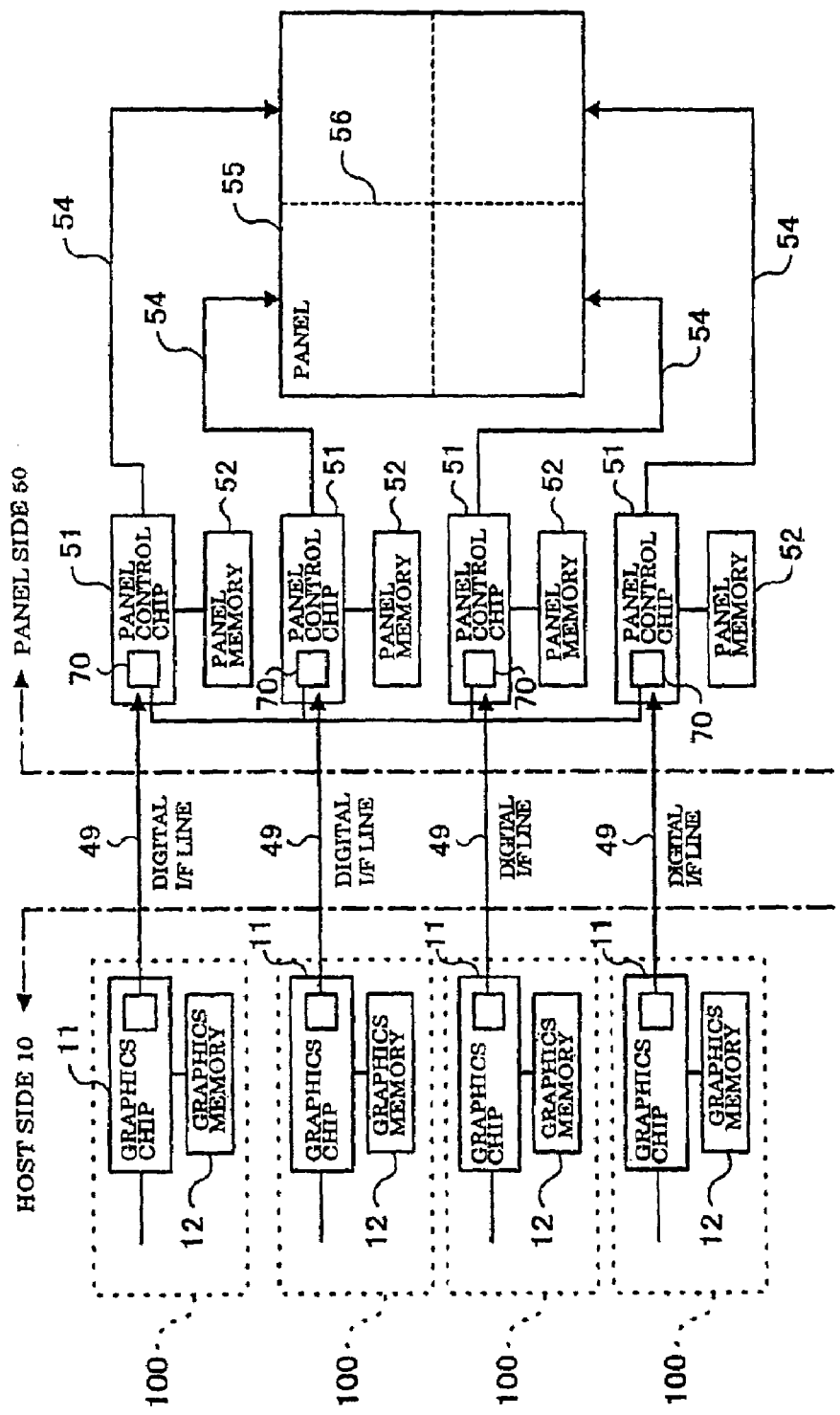
FIG. 11 is a block diagram for explaining a system constitution in a multi-system in this embodiment.

FIG. 11 is a block diagram for explaining a system constitution of the multi-system in this embodiment. As shown in FIG. 11, the panel 55 is divided into four parts by the display dividing lines 56, and the four parts are connected to the respective panel control chips 51. However, there is not always necessary to provide a plurality of panel control chips 51, but it is possible to constitute the multi-system so that the panel 55 is controlled by one control panel. To each of the respective panel control chips 51, video data is sent from the corresponding graphics chip 11 in different systems 100. On the panel side 50, the panel control chips 51 are connected to each other by the intra-panel data bust 69 so that one system 100 can simultaneously control the whole of the screen.

Here, when a moving picture is displayed by a plurality of systems (PCs and the like), the two problems concerning synchronization are generally pointed out.

One is a problem of synchronization concerning refreshing of a screen and a transfer of display data. When one display screen is used, the screen refresh has one timing, as a matter of course, and each system must be synchronized with this timing of the screen refresh. For example, suppose that a person is displayed on the upper and lower screens, and refreshing data is rewritten supposing that the person is moving toward the right. If each system is not synchronized with the timing of the screen refresh, phenomenon in which only the upper portion moves toward the right by one dot and the lower portion is left as it is will occur, on the display dividing line 56 that is the seam of the screens.

The other is the problem of synchronization of moving picture processing itself. Such problems occur when an application of the moving picture is not controlled by time. Such case is that a work load to be processed during 16 [msec] that is one frame is not decided, but a display frame is advanced in accordance with performance of the system or the screen is more finely displayed. When image data transmitted from these systems is joined and displayed the data quantity processed in each of the screens is different, so that phenomenon may occur in which the left side screen performs processing quickly and performs an image processing such as fogging, and the right side screen performs processing slowly and does not perform the image processing such as fogging.

Figure 12:
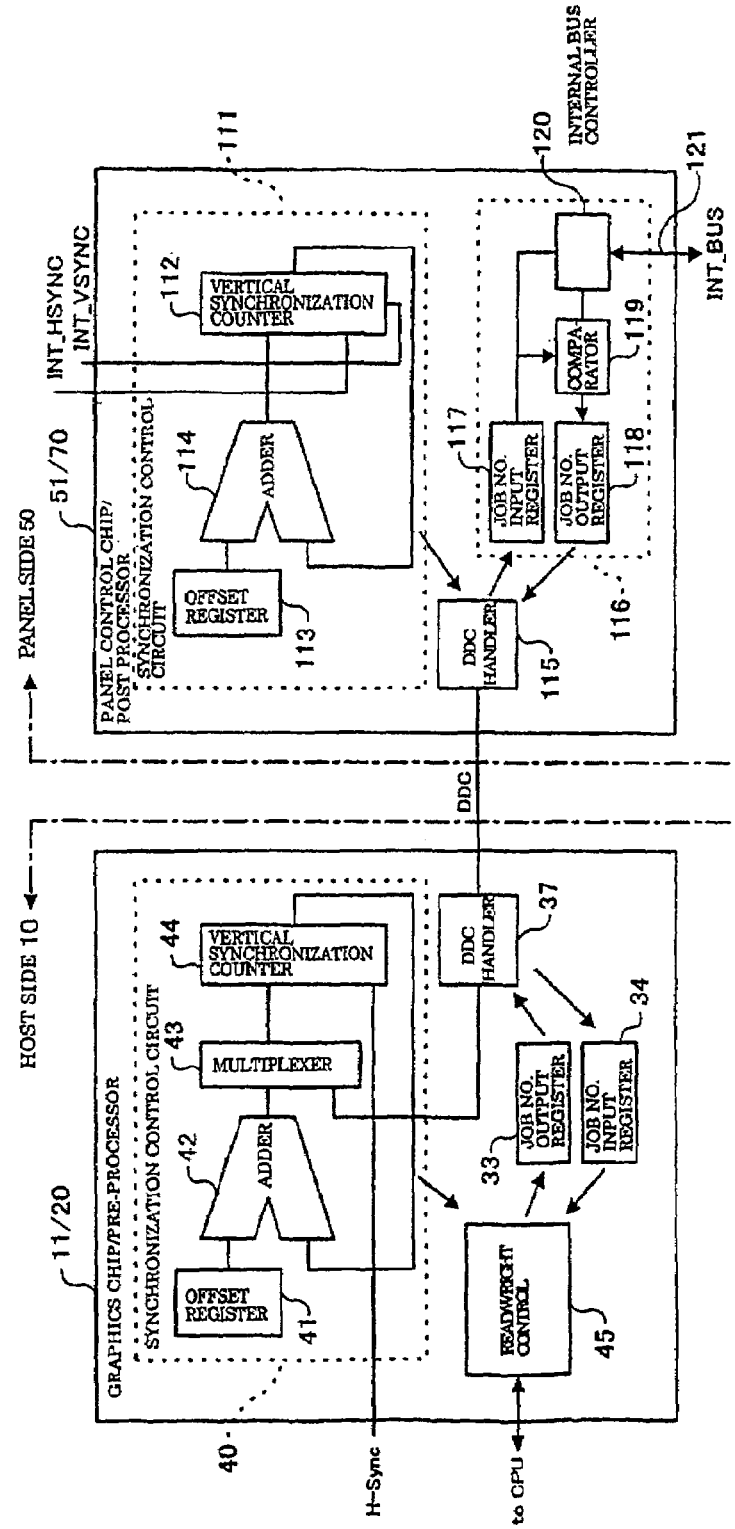
FIG. 12 is an explanatory view showing a constitution for performing a synchronization processing on the host side 10 and the panel side 50 in this embodiment.

FIG. 12 is an explanatory view showing a constitution for performing a synchronization processing between the host side 10 and the panel side 50 in this embodiment. In this embodiment, the above described two problems concerning synchronization are solved by use of a DDC signal.

In one system 100 on the host side 10, the pre-processor 20 in the graphics chip 11 comprises a synchronization control circuit 40, a read/write control 45 and the like. The synchronization control circuit 40 comprises an offset register 41, an adder 42, a multiplexer 43 and a vertical synchronization counter 44. On the other hand, the post-processor 70 of the panel control chip 51 on the panel side 50 comprises a synchronization control circuit 11, a DDC handler 115 and job number controller 116. The synchronization control circuit 111 comprises a vertical synchronization counter 112, an offset register 113 and adder 114. The job number controller 116 comprises a job number input register 117, a job number output register 118, a comparator 119, an internal bus controller 120 and an internal bus 121.

On the panel side 50, a vertical synchronization counter 112 having position information of the screen refresh is provided. In synchronization with the refresh of the panel 55, all chips have the same value by two internal synchronization signals (LNT#VSYNC and INT#HSYNC). However, when only one panel control chip 51 is provided, this is not required. An output from the offset register 113 is added to the adder 114 for each INT#HSYNC, and normalized so as not to be affected by the number of vertical lines of the panel 55. This value is read out by the DDC, and written to the vertical synchronization counter 44 in the graphics chip 11 on the system side 100. To normalize also an output from the vertical synchronization counter 44, the output from the vertical synchronization counter 44 is added to the adder 42 together with the output from the offset register 41.

Figure 13:
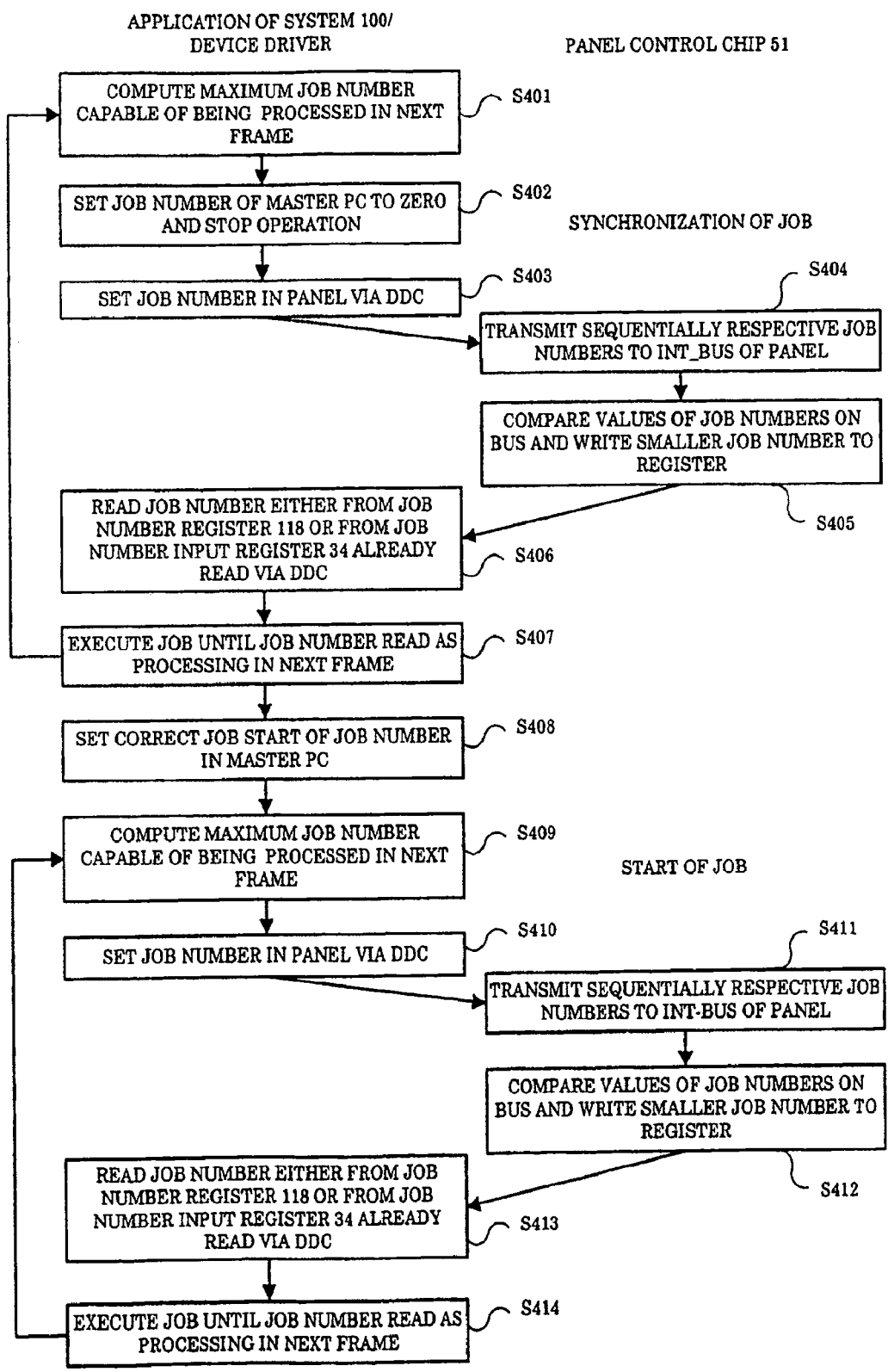
FIG. 13 is a view showing a processing flow in this embodiment.

FIG. 13 is a diagram showing a process flow in this embodiment. The left hand of FIG. 13 shows a processing flow of an application of the system 100 or on the device driver side. The right hand of FIG. 13 shows a processing flow in the panel control chip 51 on the panel side 50. This embodiment is constituted such that a work from each system 100 is managed by a job, and the multi-system composed of the plurality of systems 100 can share the drawing of an image. Here, the job (task) is a division unit to define the extent of image to be drawn, defining to which polygon (triangular shape in 3D) the image is drawn in the case of a moving picture, for example, and a job (task) number is given to divided image processing by an arbitrary unit and is expressed by sequence number. A unit of the image processing is arbitrarily selectable, and since processing in one frame is delimited, there is no problem when image processing is delimited to several ten or more units.

First, the application computes the maximum job number of processing which can be executed in a next frame at a certain timing (step 401). Further, to execute synchronization of the job, the job number of the master PC serving as a master in the plurality of systems 100 is set to zero (or minimum) and an operation is stopped (step 402). The maximum job number computed is transferred to the panel control chip 51 on the panel side 50 via the DDC. Here, the image processing presupposes that it is split up into a specified unit, and numbered in the processing order.

Each panel control chip 51 passes the respective job number sequentially to the internal bus (INT#BUS) 121 on the panel side 50 (step 404). In each panel control chip 51, the value of the job number on the bus is compared with others by the comparator 119, and the smaller job number than others is read. The smaller number read is written to the job number output register 118 (step 405).

In each system 100, the job number is read via the DDC, and the job number is read from the job number output register 118 of the panel control chip 51 or the job number input register 34 already read (step 406). In each system 100, jobs until the job number read are executed as a processing in a next frame, based on the job number read (step 407). In this embodiment, the master PC sets the job number to zero, and thus a startup of each application is stopped. The operation is started when the mater PC starts to operate, and each system 100 can acquire the job number to be processed by the application. A series of processing is executed until a correct job number is set to the master PC, and thus synchronization of the jobs with each other in the plurality of systems 100 is performed. Specifically, the processing flow can achieve the synchronization with the slowest system 100 in the plurality of systems 100. Next, the correct number is set to the master PC (step 408). Thus, the job starts. In each system 100, the maximum job number that can be processed in a next frame is computed (step 409). Similarly to the above descriptions, the job number is set with respect to the panel 55 via the DDC (step 410).

On the other hand, each panel control chip 51 passes the respective job number sequentially to the internal bus (INT#BUS) 121 on the panel side 50 (step 411). In each panel control chip 51, the value of the job number on the bus is compared with others, and the smaller job number than others is read. The smaller job number is written to the job number output register 118 (step 412).

On the system side 100, the job number is read via the DDC, and the job number is read from the job number output register 118 of the panel control chip 51 and the job number input register 34 already read (step 413). In each system 100, jobs are executed as a processing in a next frame until the job number read, based on the job number read (step 414). Thereafter, the procedure returns to step 409.

Figure 14:
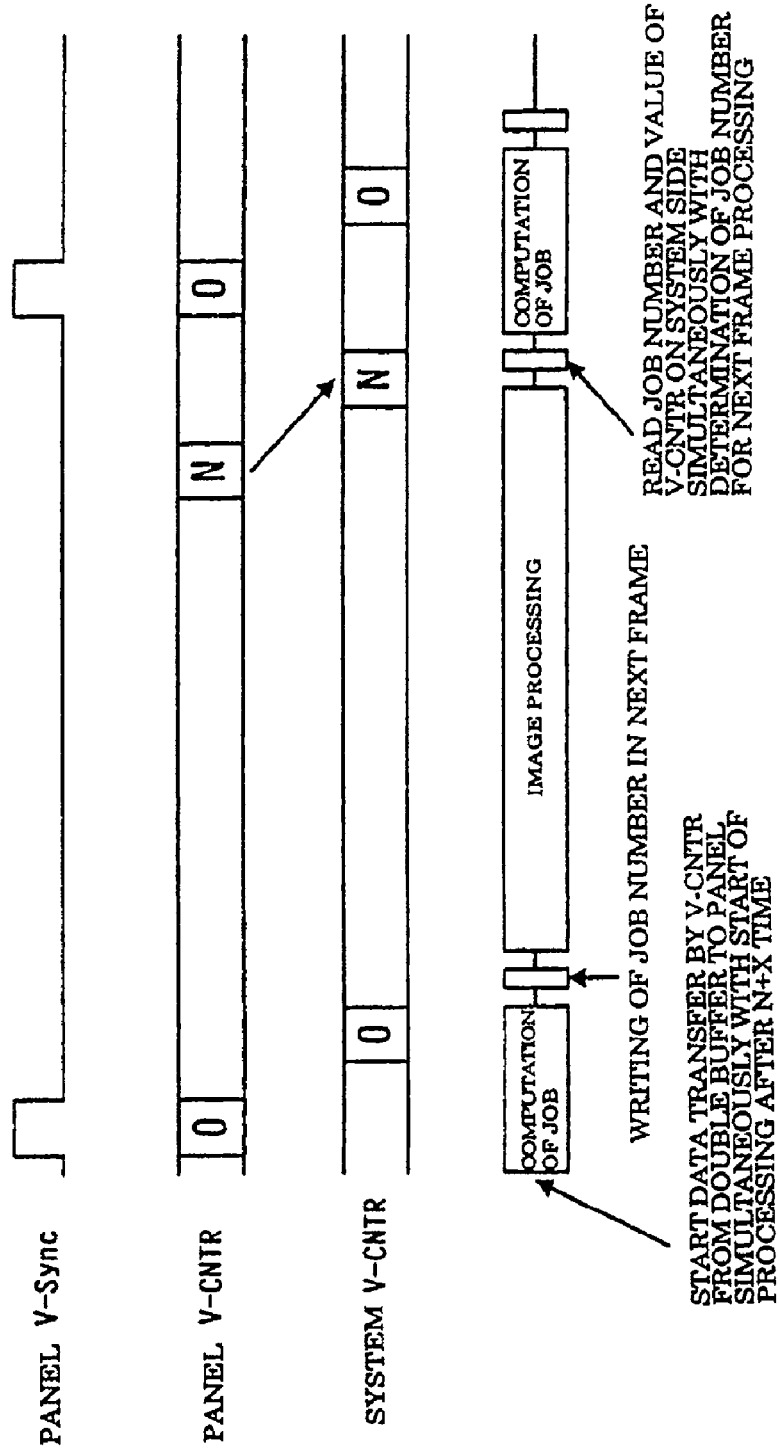
FIG. 14 is a timing chart for explaining a synchronization processing operation by the multi-system.

FIG. 14 is a timing chart for further explaining the synchronization processing operation by the multi-system, which was explained by the foregoing flowchart. The panel vertical counter (Panel V-CNTR) is set to zero for each vertical synchronization (V-SYNC), and the vertical synchronization counter 112 is counted. This register is read at a certain time point, and the value of the register is written to the vertical synchronization counter 44 on the system side 100. As shown in the timing chart of the System V-CNTR of FIG. 14, a little delay takes place in writing to the vertical synchronization counter 44. It is possible for the system side 100 to recognize the synchronization after waiting for this delay.

In the timing chart of FIG. 14, the vertical synchronization counter 44 of the system 100 uses the timing close to the maximum value, and each starts to compute the job number. In other words, to start the computation of the job number after reading work, the vertical counter (VCNTR) starts the processing after passage of (N+X) time. At the same time, the data transfer from a double buffer (not shown) of the system side 100 to the panel side 50 is begun. Then, the counted value is written to the job number input register 117 on the panel side 50. On the panel side 50, the value of each panel control chip 51 is loaded on the internal bus 121 at a suitable timing. Each panel control chip 51 reads the value to be loaded on the internal bus 121 from the internal bus controller 120. The value of the job number input register 117 and the value written to the job number output register 118 are compared with each other, and the smallest value is obtained from the comparator 119. The smallest value obtained is written to the job number output register 118 again. Thus, when reading from the system side 100 is performed, the smallest job number of each system 100 is read. The system 100 which read the smallest value of the job number executes the job having the smallest job number in the next processing, and, at the same time, performs the setting of the vertical counter (V-CNTR). In other words, in the system 110, the job number and the value of the vertical counter (V-CNTR) are read via the DDC. The job number for processing a next frame is determined, and, at the same time, the vertical counter (V-CNTR) is set.

As described above, according to the present invention, even in the case of the 3D display in which the power on the system side is lacking, it is possible to perform the display, for example, by dividing the display portion into four parts. To be more specific, if the divided four parts are driven by the four systems, respectively, it is possible to display a large screen having a size nearly equal to SXGA (1280.times.1024 dots), which is the quadruple of the divided four parts, and showing a ultra-high-resolution of 10"UXGA (200 dpi). According to this embodiment, it looks for the user that only the 3D window is supported with a high performance while displaying the whole of the screen by one system. Moreover, plural kinds of systems, that is, PCs loading entirely different OSs, can display the respective screens, and display the screen cooperatively.

Embodiment 3

In the embodiment 3, an image display method for supporting display colors composed of multi-bits, in which the number of displayed colors is increased, will be described.

The support of the displayed colors of 24 bits or more has been heretofore limited to a high-end work station. One factor of such limitation is that the system becomes expensive due to an increase in a processing speed for each portion to support the display colors of 24 bits or more. In this embodiment, by executing the distributed processing by the host side and the system side, it is possible to slow the processing speed of the system, and it is made easy to support the display colors of 24 bits or more.

In describing this embodiment, constituent components exhibiting functions essentially identical to those of the foregoing embodiments will be denoted using the same reference numerals, and detailed explanations for them are omitted.

Figure 15:
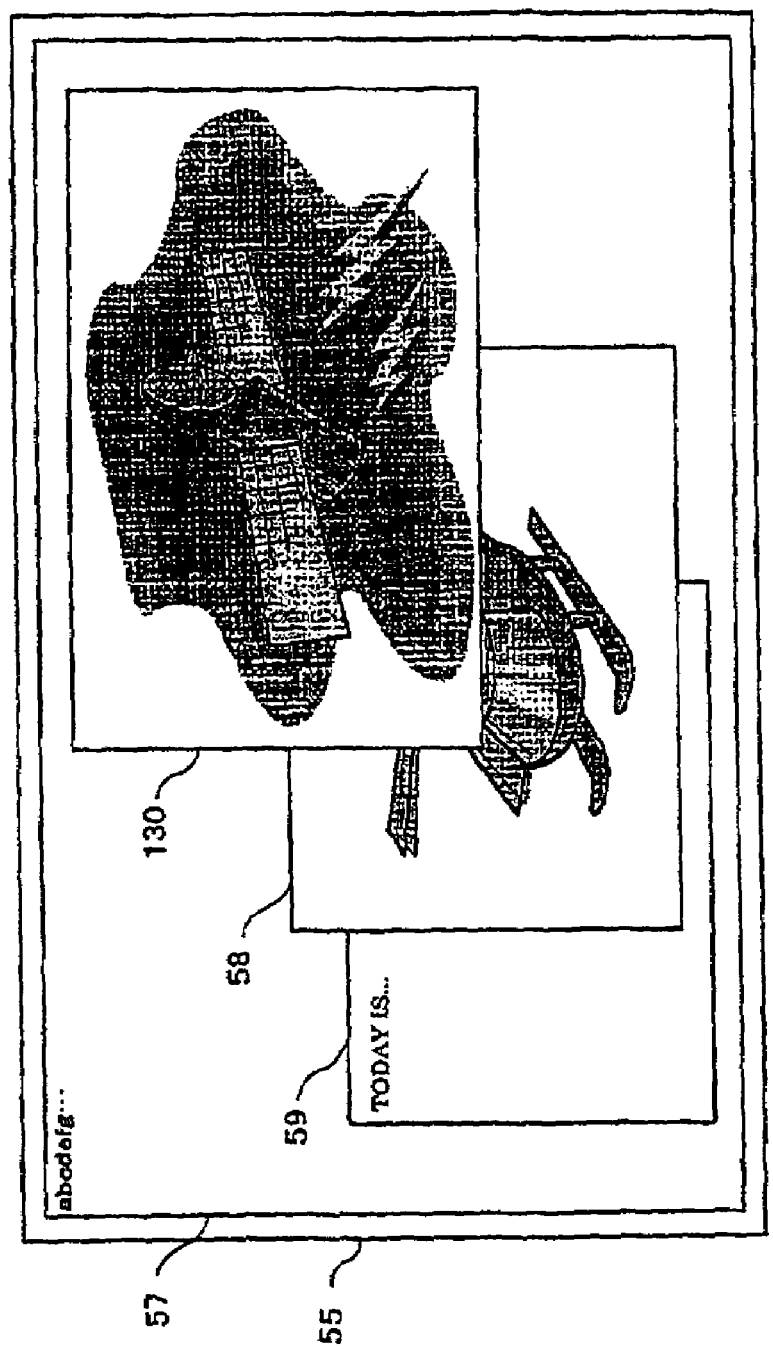
FIG. 15 is a diagram showing a state in which a color image and a monochrome image are mixedly displayed on a screen.

FIG. 15 shows a state where a color image and a monochrome image are mixedly displayed on the display screen. On the display screen 57 of the panel 55, the window 58 of a 3D moving picture screen and the window 130 of a monochrome image are displayed in addition to the window 59 composed of an ordinary text screen. In FIG. 15, the window 58 of the 3D moving picture screen is a color screen of 30 bits, and the window 130 of the monochrome image is a unicolor screen. It is possible to display the images of different types mixedly on the panel 55 which was described in the embodiments 1 and 2.

Figure 16:
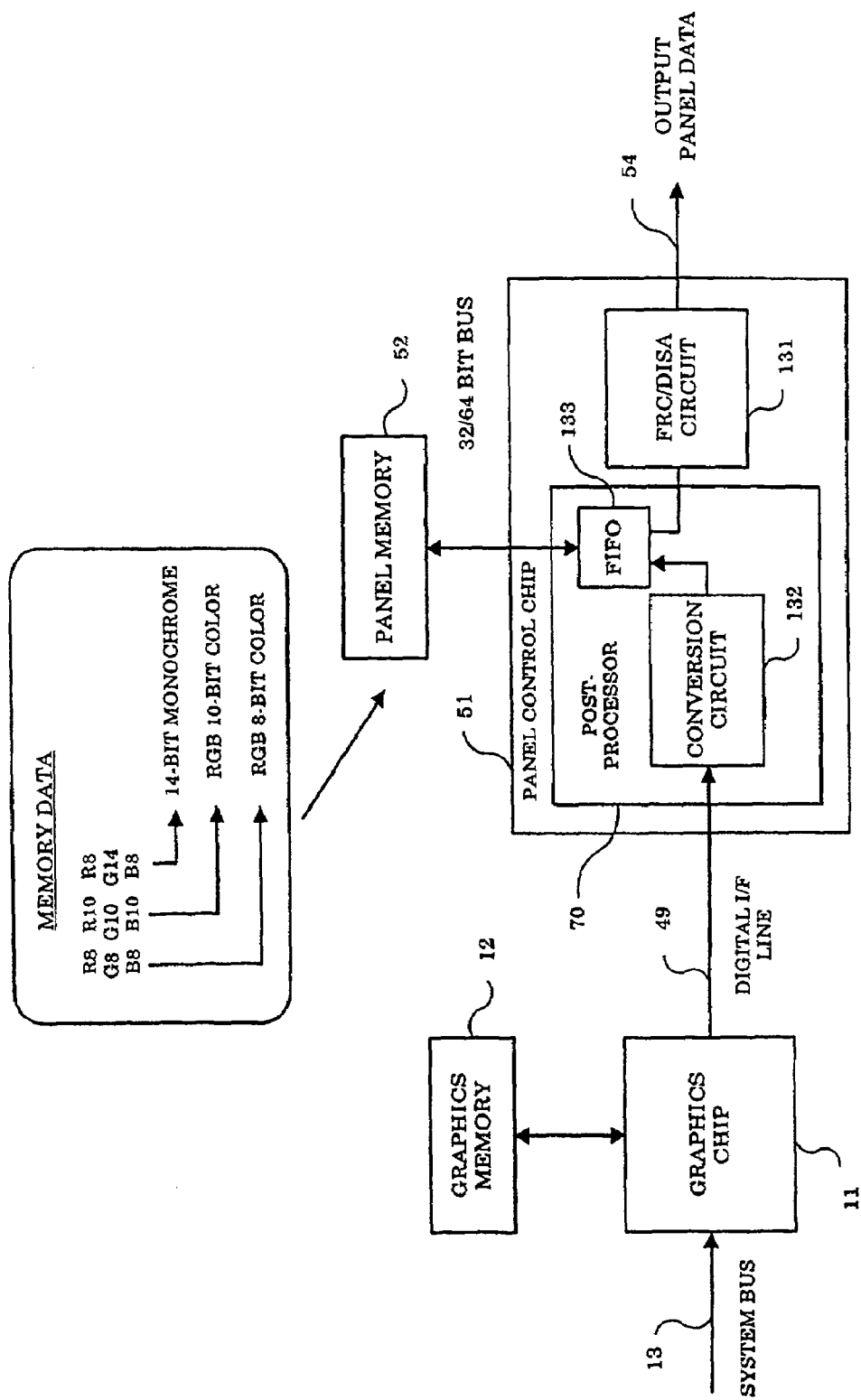
FIG. 16 is an explanatory view showing a block constitution and a control flow in an embodiment 3.
Figure 18:
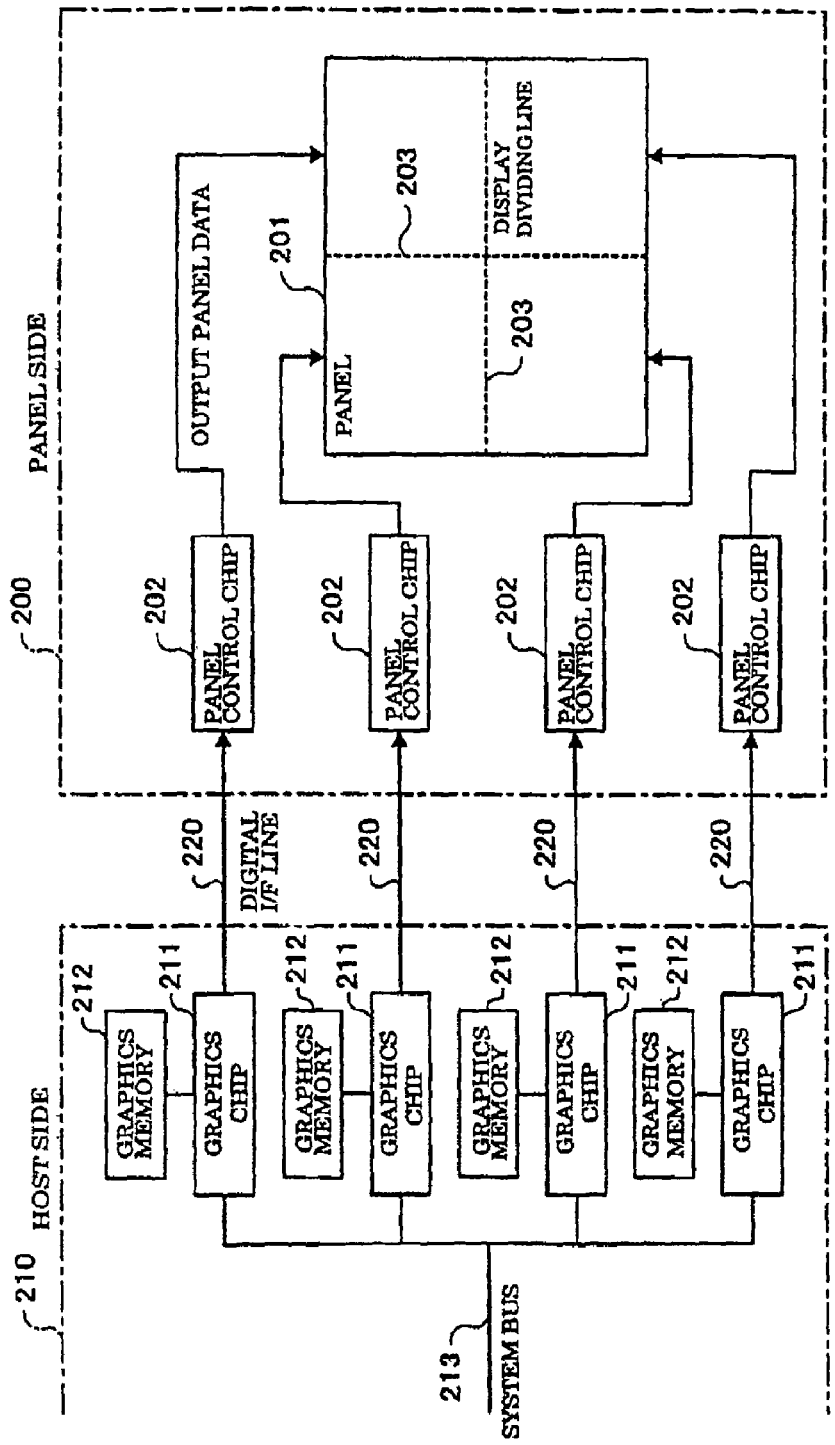
FIG. 18 is a diagram of a system constitution showing means for solving a lack in power of a graphics chip in the prior art.

FIG. 16 is a diagram for explaining a control flow and a block constitution which execute processing in this embodiment. In FIG. 16, the panel control chip 51 has a FRC/dither circuit 131 for enhancing a gradation for display. In the post-processor 70, the conversion circuit 132 for performing gamma adjustment and processing of color matching and the FIFO buffer 133 for adjusting timing of reading/writing from/to the panel memory 52 are provided.

First, processing of 30 bit colors will be described. Image data of 32 bits sent from an application of the system is inputted to the graphics chip 11 via the system bus 13. The image data is processed by the graphics chip 11, and sent to the panel control chip 51 via the digital I/F line 49. On this digital I/F line 49, the image data is transferred as 24 bit data by use of a data format to be described later. The image data sent via the digital I/F line is converted to 30 bit data again by the post-processor 70, and written to the panel memory 52. The image data takes the form in which red (R), green (G) and blue (B) are respectively 10 bits as shown in the memory data format of FIG. 16. The image data read into the FRC/dither circuit 131 is converted to 8 bit data for each of R, G and B, and transferred to an X-driver (not shown) of the panel 55 from the panel data output 54. The FRC/dither circuit 131 functions so as to enhance a gradation display for R data, G data and B data by means of temporal distribution and spatial distribution.

FIGS. 17(a) and 17(b) show a data format example by the digital I/F line 49. FIG. 17(a) shows a Transition Minimized Differential Signaling (TMDS) data transfer. FIG. 17(b) shows bit assign of 30 bit color using the TMDS. The three TMDS0 to the TMDS2 shown in FIG. 17(a) correspond to the three signals other than clocks, and perform coding from R data of 8 bit, G data of 8 bits and B data of 8 bits to R data of 10 bit, G data of 10 bits and B data of 10 bits, respectively, and transfer them. Although data for each one dot is illustrated vertically as a matter of convenience, coded data is actually transferred in series. Coding is performed for error recovery and taking the DC balance when synchronizing signals are inputted, and only R data of 8 bits, G data of 8 bits and B data of 8 bits can be used practically.

Here, in the case of 30 bit color, data shifting is performed as shown in FIG. 17(b), and each of 32 bits (8 bits.times.4) is made to correspond to one dot data. Accordingly, even in the case of contents in which four dots can be transferred in 24 bit transfer, reduction to 3 dots is brought about in 30 bit transfer. In this method, a data transfer mode can be specified in the header of the packet, and data processing is performed in accordance with the specified transfer mode. Moreover, two control bits are actually added to each dot in the 30 bit transfer, and these two bits are assigned dynamically in the data transfer mode. For example, data transfer mode is used, as Write-per-bit (a mode in which a portion showing ON of the bit is written) and vertical parity bit, by strengthening error check of the data. As described above, since the transfer mode can be freely set, 48 bit color and 64 bit color can be easily supported in terms of protocol.

Next, descriptions for unicolor display of 14 bits and for a mixing method of them will be described. In FIG. 16, when the image data is processed as 16 bit data on the application side, the image data is transferred to the system bus 13 as 16 bit data. In the digital I/F line 49 to which the image data is outputted from the graphics chip 11, the image data is transferred by mixing it within ordinary 24 bit data. Note that at the time of this transfer, the data transfer mode must be set to a 16 bit monochrome transfer mode. This 16 bit data is converted to data of 30+1 bits by the conversion circuit 132 in the post-processor 70 of the panel control chip 51. In this conversion circuit 132, the gamma adjustment and the processing of the color matching are performed as described above. This 30 bit data has a constitution in that high order 6 bits of monochrome are shared by R, G and B, and low order 6 bits are allocated (8 bits.times.3) to gamma adjustment and color matching for each R, G and B, respectively, making 30 bits in total. One bit is added for an identification bit, thus 31 bits are written to the panel memory 52. The bits in which the identification bit is ON perform monochrome processing, and the bits in which the identification bit is OFF performs the ordinary color processing.

FIG. 16 shows an example of these memory data formats. In FIG. 16, R8/G8/B8 is 8 bit color data, R10/G10/B10 is 10 bit color data, and R8/G14/B8 is 14 bit monochrome data. In the 14 bit monochrome data, 6 bits from 14 bits of G are the above described shared bits.

To show to the panel side 50 whether data to be transferred is monochrome or color, prior to a data transfer, it is specified whether the data to be transferred is monochrome or color by one bit to a pointer of the header portion of the first packet, for example, in the format of packet video data as shown in FIG. 7(c).

In this embodiment, processing to be executed subsequently is changed in accordance with the identification bit written to the panel memory 52 in the above described manner. With reference to the image data read out from the panel memory, it is decided by the identification bit whether or not the image data is monochrome. If the image data is monochrome, the low order 8 bits are added to the high order 6 bits shared by R/G/B, and 6 bits are converted to 8 bits of R/G/B by the FRC/dither circuit 131. Then, the converted 8 bits are transferred to the X-driver of the panel 55.

Note that this identification bit can be used for the processing such as gamma adjustment, color matching and scaling.

As described above, according to the present invention, the number of displayed colors is increased, a transfer speed of the image data can be varied freely, and a transfer format of the image data is constituted freely. Thus, the processing such as the gamma adjustment and the color matching can be executed on the system side and the panel side without any problem. For example, such processing is executed on both of the system side, and the image data can be transferred in a 30 bit color mode. Moreover, the panel side has a conversion table, and the data transferred to the panel side in a 24 bit color mode can be converted to 30 bit color by a selection table.

Furthermore, since identification bit for deciding whether the data is color or monochrome is used, release from processing R/G/B individually is brought about. As a result, it is possible to display a monochrome image composed of multi-bit such as 14 bits, and, for example, an application to an X-ray display in which monochrome showing a multi-gradation is required is possible. As an application example in this embodiment, a partial display of a screen of Digital Versatile Disc (DVD) is enumerated. Original DVD data is compressed, and the compressed DVD data must be uncompressed by the system and the graphics chip in the past. On the contrary, if the compressed portion is separated and data as compressed can be transferred, a transfer quantity is greatly reduced. In the case of the high-resolution panel, since a quantity of the data transfer between the host side 10 and the panel side 50 is large, if the data is in the compressed state, a band width (the number of cables) by, for example, {fraction (1/10)} cables suffices. Moreover, as described above, it is desired to display, for example, a still picture after increasing the number of colors, such as 10 bits for each R, G and B. On the other hand, OS sometimes controls the remaining window portion by 8 bits for each R, G and B. Also in such case, since the divided window can be processed dividually, it is easy to support. Moreover, it is possible to control conversion of a color adjustment such as gamma adjustment for each window. In this embodiment, an application to a technique is possible, in which even in the case of the data having a copy right of the DVD that is expected to be a problem, data may be transferred after encrypting only the copy right displaying portion thereof.

The descriptions were made in detail using the embodiments 1 to 3. According to these embodiments, even when the ultra-high-resolution image data of which dots are invisible is to be outputted, the ultra-high-resolution image data can be displayed without any deterioration of performance of the whole of the system such as lacking in capacity and a delay of a processing speed.

Furthermore, even when a high resolution of the display is further progressed, a physical interface needs not to be changed every time of the progress of the definition, so that practicability and economical efficiency are brought about.

As described above, according to the present invention, it is possible to achieve the distributed processing on the host side and the panel side (monitor side), and a work load of the whole of the system including the graphics chip can be optimized.

Moreover, the processing capability of the image display system including the transfer capability can be exhibited sufficiently, and the problem such as lack in the display capability on the ultra-high-resolution panel and the multi-panel can be solved.

Moreover, also in the 3D graphics of which a high transfer speed is required, it is possible to achieve a suitable display on the ultra-high-resolution panel.

Although the preferred embodiments of the present invention have been described in detail, it should be understood that various changes, substitutions and alternations can be made therein without departing from spirit and scope of the inventions as defined by the appended claims.

What is claimed is:

1. An image display system comprising:
 a host side for processing a plurality sets of undeveloped image data showing different display characteristics respectively, said host side comprising:
  a plurality of pre-processors for adding a plurality of window IDs to said sets of undeveloped image data respectively, wherein said window IDs correspond to a plurality of windows in a one-to-one manner, each of said at least one pre-processor comprising:
   a plurality of pre-handlers in charge of respectively processing said windows corresponding to said sets of undeveloped image data in one-to-one manner;
 a panel side comprising:
  a panel divided into a plurality of sub-panels for displaying said windows;
  a plurality of post-processors for recognizing said window IDs and developing said sets of undeveloped image data into a plurality sets of developed data forming a plurality of images, wherein said post-processors controls said sub-panels in one-to-one manner, and are connected to said pre-processors in one-to-one manner, each of said post-processors comprising:
   a plurality of post-handlers in charge of respectively processing said windows corresponding to said sets of developed data in one-to-one manner, thereby displaying said images on said windows respectively, wherein said pre-processors output first control signals for synchronization with said panel to said post-processors, and said post-processors output second control signals for synchronization with said panel to said pre-processors, based on the first control signals outputted from said pre-processors; and
  a plurality of panel memories connected to said at least one post-processor in the one-to-one manner, wherein said sets of developed data are stored in said panel memories; and
 a plurality of digital interfaces for transferring said sets of undeveloped image data from said host side to said panel side.

2. The image display system according to claim 1, wherein said digital interfaces transfer each of said sets of undeveloped image data by packets, and transfers said sets of undeveloped image data by specifying a data transfer mode in each of said packets, and each of said sets of undeveloped image data is developed in accordance with said data transfer mode specified.

3. The image display system according to claim 2, wherein the packet for each of said sets of undeveloped image data comprises:
 a header portion including one of said window ID corresponding to a name tag of said each of said sets of undeveloped image data.

4. The image display system according to claim 1, wherein said sets of undeveloped image data are selected from the group consisting of text data, Digital Versatile Disc (DVD) data, 32-bit color image data, 3D animation data and the combinations thereof.

5. The image display system according to claim 1, wherein said images are displayed with different resolutions in accordance with the display characteristics of said sets of undeveloped image data.

6. The image display system according to claim 5, wherein each of said digital interfaces changes a transfer format depending on said application executed by said host side.

7. The image display system according to claim 1, wherein said sets of undeveloped image data are generated from at least one application.

8. The image display system according to claim 7, wherein said at least one application is executed by said host side.

9. The image display system according to claim 1, wherein said host side comprising:
   a plurality of graphics chips comprising said pre-processors respectively.

10. The image display system according to claim 9, wherein each of said graphics chips further comprises:
    a D/A converter for outputting color data to said pre-processor; and
    an address generator for outputting an address signal to said pre-processor.

11. The image display system according to claim 1, wherein each of said pre-handlers comprises:
    a window ID register showing the corresponding window ID of the corresponding window;
    a clip register indicating an actually writable area;
    a position register indicating a position of the transfer data of the corresponding set of undeveloped image data;
    a scale register indicating a magnifying power for scaling the corresponding set of undeveloped image data;
    a mode register indicating a transfer mode and a writing mode of the corresponding set of undeveloped image data; and
    a priority register indicating a priority for the corresponding window ID.

12. The image display system according to claim 1, wherein said panel side comprising:
    a plurality of panel control chips comprising said post-processors respectively.

13. The image display system according to claim 1, wherein each of said post-handlers comprises:
    a window ID register indicating the corresponding window ID of a packet;
    a clip register indicating an actually writable area;
    a position register indicating a position of the transfer data of the corresponding set of undeveloped image data;
    a scale register indicating a magnifying power for scaling the corresponding set of undeveloped image data;
    a mode register indicating a transfer mode and a writing mode for a mode register indicating a transfer mode and a writing mode of the corresponding set of undeveloped image data;
    a priority register indicating a priority of a clip area of the corresponding post-handler; and
    an error status register showing an error status in processing on said panel side.

* * * * *